(12) United States Patent
Wang et al.

(10) Patent No.: US 12,408,095 B2
(45) Date of Patent: Sep. 2, 2025

(54) COMMUNICATION METHOD AND APPARATUS

(71) Applicant: Huawei Technologies Co., Ltd., Shenzhen (CN)

(72) Inventors: Rui Wang, Shanghai (CN); Mingzeng Dai, Shenzhen (CN); Qinghai Zeng, Shanghai (CN); Wenjie Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 403 days.

(21) Appl. No.: 17/809,634

(22) Filed: Jun. 29, 2022

(65) Prior Publication Data
US 2022/0338090 A1 Oct. 20, 2022

Related U.S. Application Data

(63) Continuation of application No. PCT/CN2019/130844, filed on Dec. 31, 2019.

(51) Int. Cl.
*H04W 36/32* (2009.01)
*H04W 36/08* (2009.01)

(52) U.S. Cl.
CPC ........ *H04W 36/328* (2023.05); *H04W 36/083* (2023.05)

(58) Field of Classification Search
None
See application file for complete search history.

(56) References Cited

U.S. PATENT DOCUMENTS

| 2019/0045406 | A1 | 2/2019 | Kalathil et al. |
| 2020/0245215 | A1* | 7/2020 | Han ...................... H04W 88/02 |
| 2020/0394928 | A1* | 12/2020 | Neubauer .......... H04B 7/18506 |
| 2022/0038976 | A1* | 2/2022 | Hwang ............. H04W 36/0079 |

FOREIGN PATENT DOCUMENTS

| CN | 103945365 | A | | 7/2014 | |
| CN | 109451833 | A | * | 3/2019 | ........... B64C 39/024 |
| WO | 2018175721 | A1 | | 9/2018 | |
| WO | 2019028858 | A1 | | 2/2019 | |
| WO | 2019056982 | A1 | | 3/2019 | |

* cited by examiner

*Primary Examiner* — Adolf Dsouza
(74) *Attorney, Agent, or Firm* — Slater Matsil, LLP

(57) ABSTRACT

Methods and apparatuses are provided. An example method includes receiving a candidate conditional handover configuration group for handing over the terminal to another access network device. The candidate conditional handover configuration group includes candidate conditional handover configurations that correspond to a flight-related parameter of the terminal. The flight-related parameter includes flight path information including flight point information of each of one or more flight points. The example further includes obtaining a current flight parameter of the terminal that includes a current flight point parameter. The example further includes determining a target conditional handover configuration by at least determining a target flight point from the flight points based on a matching relationship between the current flight point parameter and the flight point information, and obtaining, from the candidate conditional handover configuration group, a candidate conditional handover configuration corresponding to the target flight point as the target conditional handover configuration.

20 Claims, 10 Drawing Sheets

| Index | Flight point information | Flight height parameter | Candidate conditional handover configuration group |
|---|---|---|---|
| 1 | Flight point information 1 (Flight point 1) | H < 1000 m | Candidate conditional handover configuration 11 |
| | | 1000 m ≤ H < 1500 m | Candidate conditional handover configuration 12 |
| | | H ≥ 1500 m | Candidate conditional handover configuration 13 |
| 2 | Flight point information 2 (Flight point 2) | H < 1000 m | Candidate conditional handover configuration 21 |
| | | 1000 m ≤ H < 1500 m | Candidate conditional handover configuration 22 |
| | | H ≥ 1500 m | Candidate conditional handover configuration 23 |
| 3 | Flight point information 3 (Flight point 3) | H < 1000 m | Candidate conditional handover configuration 31 |
| | | 1000 m ≤ H < 1500 m | Candidate conditional handover configuration 32 |
| | | H ≥ 1500 m | Candidate conditional handover configuration 33 |

P' = (S', H')
= (Flight point information 1, 1375 m)

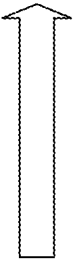

FIG. 2J

COMMUNICATION METHOD AND APPARATUS

CROSS-REFERENCE TO RELATED APPLICATIONS

This application is a continuation of International Application No. PCT/CN2019/130844, filed on Dec. 31, 2019, the disclosure of which is hereby incorporated by reference in its entirety.

TECHNICAL FIELD

This application relates to the field of communication technologies, and in particular, to a communication method and an apparatus.

BACKGROUND

Application of a flight terminal, for example, a crewed aerial vehicle, an uncrewed aerial vehicle (UAV; or Airborne UE), or an air wearable device, is increasingly popular in society nowadays. The uncrewed aerial vehicle is used as an example. Because the uncrewed aerial vehicle has special flight-related parameters, such as a flight height, a flight speed, and a flight path, a communication environment of the uncrewed aerial vehicle is different from a communication environment of common UE. In a schematic diagram of communication between an uncrewed aerial vehicle and a base station shown in FIG. 1, it is generally considered that the uncrewed aerial vehicle moves above the base station. In addition, different types of uncrewed aerial vehicles have different flight heights. Therefore, in a same network deployment, a cell topology seen on the ground may be greatly different from a cell topology seen in the air. This is because there are few obstacles in the air, and a signal side lobe of a remote base station may cover a nearby area.

In addition, because a relationship between a serving cell and a neighboring cell of the uncrewed aerial vehicle in the air is different from a relationship between the serving cell and the neighboring cell of the uncrewed aerial vehicle on the ground, in a moving process of the uncrewed aerial vehicle, a handover time point and a target cell for handover may be different from a handover time point and a target cell for handover on the ground. To ensure handover performance, flight path requesting and reporting are defined, to assist a network in determining the best serving cell/base station.

However, how to enable the uncrewed aerial vehicle to perform serving cell handover more accurately and quickly in a flight process is an urgent problem to be resolved.

SUMMARY

Embodiments of this application provide a communication method and an apparatus, so that a terminal in flight completes cell handover more quickly and accurately based on a flight-related parameter.

According to a first aspect, a communication method is provided. The communication method is applied to a terminal, and includes: receiving a candidate conditional handover configuration group, where the candidate conditional handover configuration group includes one or more candidate conditional handover configurations, and the one or more candidate conditional handover configurations correspond to at least one flight-related parameter of the terminal; and obtaining a current flight parameter, and determining a target conditional handover configuration from the candidate conditional handover configuration group based on the current flight parameter.

In this embodiment of this application, the terminal obtains, based on a matching result between the current flight parameter and the flight-related parameter, the target conditional handover configuration in the plurality of candidate conditional handover configurations corresponding to the flight-related parameter. In this way, accuracy of the obtained target conditional handover configuration is improved, and efficiency of serving cell handover of the terminal is improved.

In an optional example, the current flight parameter includes a current flight height, the flight-related parameter includes a flight height parameter, and the determining a target conditional handover configuration from the candidate conditional handover configuration group based on the current flight parameter includes: determining, based on a correspondence between the current flight height and the flight height parameter, the target conditional handover configuration from a candidate conditional handover configuration group corresponding to the flight height parameter.

In this embodiment of this application, the terminal matches the flight height parameter corresponding to the current flight height, and obtains the target conditional handover configuration corresponding to the flight height parameter. Then, the terminal determines a target cell based on the target conditional handover configuration. This can reduce a case in which the terminal cannot correctly establish a connection to a candidate cell based on a conditional handover configuration because the terminal flies at different heights, and improve the efficiency of serving cell handover of the terminal.

In an optional example, the flight height parameter is a plurality of height ranges, and the determining, based on a correspondence between the current flight height and the flight height parameter, the target conditional handover configuration from a candidate conditional handover configuration group corresponding to the flight height parameter includes: obtaining a target height range, where the target height range is a height range corresponding to the current flight height; and obtaining, from the candidate conditional handover configuration group corresponding to the flight height parameter, a candidate conditional handover configuration corresponding to the target height range, and determining the candidate conditional handover configuration as the target conditional handover configuration.

In an optional example, the flight-related parameter includes flight path information, the flight path information includes flight point information of each of one or more flight points, the one or more flight points are in a one-to-one correspondence with the one or more candidate conditional handover configurations, the current flight parameter includes a current flight point parameter, and the determining a target conditional handover configuration from the candidate conditional handover configuration group based on the current flight parameter includes: determining a target flight point from the one or more flight points based on a matching relationship between the current flight point parameter and the flight point information; and obtaining, from a candidate conditional handover configuration group corresponding to the flight point, a candidate conditional handover configuration corresponding to the target flight point as the target conditional handover configuration.

In an optional example, the current flight point parameter includes a current system time point, the flight point information includes an estimated time point of arrival, and the determining a target flight point from the one or more flight points based on a matching relationship between the current flight point parameter and the flight point information of each of the one or more flight points includes: obtaining a target time point, where the target time point is a time point that matches the current system time point in the estimated time point of arrival; and using a flight point corresponding to the target time point as the target flight point.

In an optional example, the current flight point parameter includes a current flight location, the flight point information includes a flight point location, and the determining a target flight point from the one or more flight points based on a matching relationship between the current flight point parameter and the flight point information of each of the one or more flight points includes: obtaining a target flight point location, where the target flight point location is a location that matches the current flight location in the flight point location; and using a flight point corresponding to the target flight point location as the target flight point.

In an optional example, the current flight point parameter includes a current system time point and a current flight location, the flight point information includes an estimated time point of arrival and a flight point location, and the determining a target flight point from the one or more flight points based on a matching relationship between the current flight point parameter and the flight point information of each of the one or more flight points includes: obtaining a target time point, where the target time point is a time point that matches the current system time point in the estimated time point of arrival; obtaining a flight point location corresponding to the target time point, and determining whether the flight point location matches the current flight location; and when the flight point location successfully matches the current flight location, determining a flight point corresponding to the flight point location as the target flight point.

In this embodiment of this application, the terminal matches the target flight point based on the current flight point parameter, including the current system time point, the current flight location, or a combination thereof, and then obtains the candidate conditional handover configuration corresponding to the target flight point as the target conditional handover configuration used by the terminal to determine a target cell. The candidate conditional handover configuration prepared in advance can effectively improve efficiency of selecting and accessing the target cell by the terminal.

In an optional example, the flight path information further includes a flight height parameter corresponding to each flight point, the current flight parameter includes a current flight height, and the using a candidate conditional handover configuration corresponding to the target flight point as the target conditional handover configuration includes: obtaining a target height of the target flight point, where the target height is a flight height parameter that matches the current flight height; and determining, based on the target height, the target conditional handover configuration from the candidate conditional handover configuration group corresponding to the target flight point.

In this embodiment of this application, the candidate conditional handover configuration corresponding to the target height in the target flight point may be matched based on the current flight point parameter and the current flight height. The candidate conditional handover configuration is used as the target conditional handover configuration, so that when the terminal is handed over between cells, the terminal can also obtain an accurate corresponding conditional handover configuration for a candidate cell difference existing at different heights of the target flight point while flight point correspondence is considered. In this way, the accuracy of the target conditional handover configuration obtained by the terminal is improved, and efficiency of performing cell handover by the terminal is improved.

In an optional example, the method further includes: after handover is completed based on the target conditional handover configuration, releasing the candidate conditional handover configuration group.

In an optional example, the method further includes: after an update candidate conditional handover configuration group is received, releasing the candidate conditional handover configuration group.

In an optional example, the method further includes: after a first preset time point is reached, releasing the candidate conditional handover configuration group.

According to a second aspect, a communication method is provided. The communication method is applied to an access network device, and includes: generating a candidate conditional handover configuration group, where the candidate conditional handover configuration group includes one or more candidate conditional handover configurations, and the one or more candidate conditional handover configurations correspond to at least one flight-related parameter of a terminal; and sending the candidate conditional handover configuration group to the terminal.

In an optional example, the flight-related parameter includes a flight height parameter, and the generating a candidate conditional handover configuration group includes: generating a candidate conditional handover configuration group corresponding to the flight height parameter.

In an optional example, the flight height parameter is a plurality of height ranges, and the generating a candidate conditional handover configuration group corresponding to the flight height parameter includes: generating a candidate conditional handover configuration group corresponding to the plurality of height ranges.

In an optional example, the flight-related parameter includes flight path information, the flight path information includes one or more flight points and flight point information of the flight point, and the generating a candidate conditional handover configuration group includes: generating a candidate conditional handover configuration group corresponding to the flight point information, where the flight point information is used to uniquely identify the flight point, and the one or more flight points are in a one-to-one correspondence with the one or more candidate conditional handover configurations in the candidate conditional handover configuration group.

In an optional example, the flight point information includes an estimated time point of arrival of each flight point, and the generating a candidate conditional handover configuration group corresponding to the flight point information includes: generating, based on the estimated time point of arrival of each flight point, a candidate conditional handover configuration corresponding to each flight point, to form a candidate conditional handover configuration group corresponding to the one or more flight points.

In an optional example, the flight point information includes a flight point location of each flight point, and the generating a candidate conditional handover configuration group corresponding to the flight point information includes: generating, based on the flight point location of each flight point, a candidate conditional handover configuration corresponding to each flight point, to form a candidate conditional handover configuration group corresponding to the flight point.

In an optional example, the flight point information includes a flight point location and an estimated time point of arrival of each flight point, and the generating a candidate conditional handover configuration group corresponding to the flight point information includes: generating, based on the flight point location and the estimated time point of arrival of each flight point, a candidate conditional handover configuration corresponding to each flight point, to form a candidate conditional handover configuration group corresponding to the flight point.

In an optional example, the flight path information further includes a flight height parameter, and the generating a candidate conditional handover configuration group corresponding to the flight point information includes: generating, based on the flight point information of each flight point and the flight height parameter, a candidate conditional handover configuration group corresponding to each flight point, to form a candidate conditional handover configuration group corresponding to the flight point.

In an optional example, the sending the candidate conditional handover configuration group to the terminal includes: sending the candidate conditional handover configuration group to the terminal by using radio resource control RRC dedicated signaling.

In an optional example, the method further includes: sending the candidate conditional handover configuration group to another access network device.

According to a third aspect, a terminal apparatus is provided. The apparatus includes: a receiving unit, configured to receive a candidate conditional handover configuration group, where the candidate conditional handover configuration group includes one or more candidate conditional handover configurations, and the one or more candidate conditional handover configurations correspond to at least one flight-related parameter of a terminal; and a processing unit, configured to: obtain a current flight parameter, and determine a target conditional handover configuration from the candidate conditional handover configuration group based on the current flight parameter.

In an optional example, the current flight parameter includes a current flight height, and the flight-related parameter includes a flight height parameter. The processing unit is specifically configured to: determine, based on a correspondence between the current flight height and the flight height parameter, the target conditional handover configuration from a candidate conditional handover configuration group corresponding to the flight height parameter.

In an optional example, the flight height parameter is a plurality of height ranges. The processing unit is specifically configured to: obtain a target height range, where the target height range is a height range corresponding to the current flight height; and obtain a candidate conditional handover configuration corresponding to the target height range, and determine the candidate conditional handover configuration as the target conditional handover configuration.

In an optional example, the flight-related parameter includes flight path information, the flight path information includes flight point information of each of one or more flight points, the one or more flight points are in a one-to-one correspondence with the one or more candidate conditional handover configurations, and the current flight parameter includes a current flight point parameter. The processing unit is specifically configured to: determine a target flight point from the one or more flight points based on a matching relationship between the current flight point parameter and the flight point information of each of the one or more flight points; and use a candidate conditional handover configuration corresponding to the target flight point as the target conditional handover configuration.

In an optional example, the current flight point parameter includes a current system time point, and the flight point information includes an estimated time point of arrival. The processing unit is specifically configured to: obtain a target time point, where the target time point is a time point that matches the current system time point in the estimated time point of arrival; and use a flight point corresponding to the target time point as the target flight point.

In an optional example, the current flight point parameter includes a current flight location, and the flight point information includes a flight point location. The processing unit is specifically configured to: obtain a target flight point location, where the target flight point location is a location that matches the current flight location in the flight point location; and use a flight point corresponding to the target flight point location as the target flight point.

In an optional example, the current flight point parameter includes a current system time point and a current flight location, and the flight point information includes an estimated time point of arrival and a flight point location. The processing unit is specifically configured to: obtain a target time point, where the target time point is a time point that matches the current system time point in the estimated time point of arrival; obtain a flight point location corresponding to the target time point, and determine whether the flight point location matches the current flight location; and when the flight point location successfully matches the current flight location, determine a flight point corresponding to the flight point location as the target flight point.

In an optional example, the flight path information further includes a flight height parameter corresponding to each flight point, the current flight parameter includes a current flight height, and the candidate conditional handover configuration corresponding to the target flight point is a candidate conditional handover configuration group corresponding to a combination of flight point information of the target flight point and the flight height parameter. The processing unit is specifically configured to: obtain a target height of the target flight point, where the target height is a flight height parameter that matches the current flight height; and determine, based on the target height, the target conditional handover configuration from the candidate conditional handover configuration group.

In an optional example, the processing unit is further configured to: after handover is completed based on the target conditional handover configuration, release the candidate conditional handover configuration group.

In an optional example, the processing unit is further configured to: after an update candidate conditional handover configuration group is received, release the candidate conditional handover configuration group.

In an optional example, the processing unit is further configured to: after a first preset time point is reached, release the candidate conditional handover configuration group.

According to a fourth aspect, a communication apparatus is provided. The apparatus includes: a processing unit, configured to generate a candidate conditional handover configuration group, where the candidate conditional handover configuration group includes one or more candidate conditional handover configurations, and the one or more candidate conditional handover configurations correspond to at least one flight-related parameter of a terminal; and a sending unit, configured to send the candidate conditional handover configuration group to the terminal.

In an optional example, the flight-related parameter includes a flight height parameter, and the generating a candidate conditional handover configuration group includes: generating a candidate conditional handover configuration group corresponding to the flight height parameter.

In an optional example, the flight height parameter is a plurality of height ranges. The processing unit is specifically configured to: generate a candidate conditional handover configuration group corresponding to the plurality of height ranges.

In an optional example, the flight-related parameter includes flight path information. The processing unit is specifically configured to: generate a candidate conditional handover configuration group corresponding to flight point information, where the flight point information of each of one or more flight points is in a one-to-one correspondence with the one or more candidate conditional handover configurations in the candidate conditional handover configuration group.

In an optional example, the flight point information includes an estimated time point of arrival of each flight point. The processing unit is specifically configured to: generate, based on the estimated time point of arrival of each flight point, a candidate conditional handover configuration corresponding to each flight point, to form a candidate conditional handover configuration group corresponding to the flight point.

In an optional example, the flight point information includes a flight point location of each flight point. The processing unit is specifically configured to: generate, based on the flight point location of each flight point, a candidate conditional handover configuration corresponding to each flight point, to form a candidate conditional handover configuration group corresponding to the flight point.

In an optional example, the flight point information includes a flight point location and an estimated time point of arrival of each flight point. The processing unit is specifically configured to: generate, based on the flight point location and the estimated time point of arrival of each flight point, a candidate conditional handover configuration corresponding to each flight point, to form a candidate conditional handover configuration group corresponding to the flight point.

In an optional example, the flight path information further includes a flight height parameter. The processing unit is specifically configured to: generate, based on the flight point information of each flight point and the flight height parameter, a candidate conditional handover configuration group corresponding to each flight point, to form a candidate conditional handover configuration group corresponding to the flight point.

In an optional example, an output unit is specifically configured to: send the candidate conditional handover configuration group to the terminal by using radio resource control RRC dedicated signaling.

In an optional example, the output unit is further configured to: send the candidate conditional handover configuration group to another access network device.

According to a fifth aspect, a communication apparatus is provided. The communication apparatus includes: a processor and a memory. The processor and the memory are electrically coupled.

The processor invokes some or all of computer program instructions stored in the memory, to enable the communication apparatus to perform any method according to the first aspect or the second aspect.

According to a sixth aspect, a computer-readable storage medium is provided. The computer-readable storage medium stores computer-readable instructions. When a computer reads and executes the computer-readable instructions, the computer is enabled to perform any method according to the first aspect or the second aspect.

According to a seventh aspect, a communication system is provided. The communication system includes a terminal and an access network device. The terminal is configured to perform any method according to the first aspect, and the access network device is configured to perform any method according to the second aspect.

BRIEF DESCRIPTION OF THE DRAWINGS

To describe the technical solutions in embodiments of this application or the conventional technology more clearly, the following briefly describes the accompanying drawings used in describing the embodiments.

FIG. 2J is still yet another schematic diagram of a process of determining a target conditional handover configuration according to an embodiment of this application;

DETAILED DESCRIPTION OF ILLUSTRATIVE EMBODIMENTS

Figure 1:
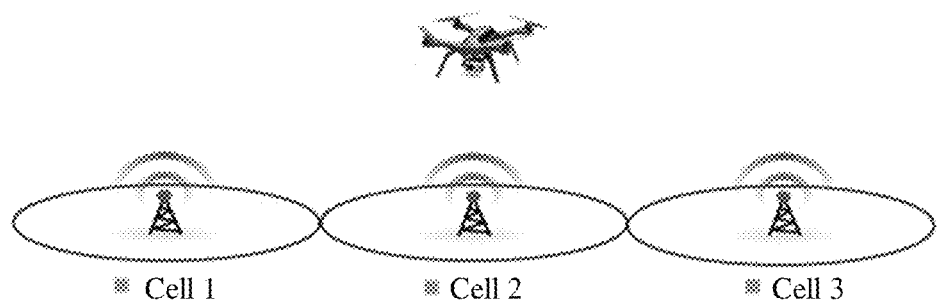
FIG. 1 is a schematic diagram of communication between an uncrewed aerial vehicle and a base station according to an embodiment of this application.

The following describes technical solutions in embodiments of this application with reference to the accompanying drawings in embodiments of this application.

In embodiments of the specification, claims, and accompanying drawings of this application, the terms "first", "second", and the like are intended to distinguish between similar objects but do not necessarily indicate a specific order or sequence. In addition, terms "including" and "having" and any variant thereof are intended to cover non-exclusive inclusion, for example, include a series of steps or units. A method, system, product, or device is not necessarily limited to those steps or units that are expressly listed, but may include other steps or units that are not expressly listed or inherent to such a process, method, product, or device.

It should be understood that, in this application, "at least one" means one or more, and "a plurality of" means two or more. The term "and/or" is used to describe an association relationship between associated objects and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one (piece) of a, b, or c may represent: a, b, c, "a and b", "a and c", "b and c", or "a, b, and c", where a, b, and c may be singular or plural.

A terminal mentioned in embodiments of this application includes a terminal device, user equipment (UE), a mobile station (MS), a mobile terminal (MT), and the like, and is a device that provides voice and/or data connectivity for a user.

In embodiments of this application, an access network device may be any communication device that has a wireless transceiver function and that is configured to communicate with the terminal device. The device includes but is not limited to an evolved NodeB (eNB), a radio network controller (RNC), a NodeB (NB), a base station controller (BSC), a base transceiver station (BTS), a home base station (home evolved NodeB, HeNB or home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the device may be a gNB or a transmission point (a TRP or a TP) in a 5G system such as an NR system; may be an antenna panel or a group of antenna panels (including a plurality of antenna panels) of a base station in a 5G system; or may be a network node, such as a baseband unit (BBU) or a distributed unit (DU), that constitutes a gNB or a transmission point. The access network device in embodiments of this application may also be referred to as a radio access network (RAN) device or a RAN node.

In some deployments, the access network device in embodiments of this application may be a central unit (CU) or a distributed unit (DU), or the access network device includes a CU and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU, or being sent by the DU and the AAU. It may be understood that the access network device may be a device including one or more of a CU node, a DU node, and an AAU node.

Further, the CU may be divided into a control plane central unit (CU-CP) and a user plane central unit (CU-UP). The CU-CP and the CU-UP may also be deployed on different physical devices. The CU-CP is responsible for a control plane function, and mainly includes the RRC layer and a PDCP-C layer. The PDCP-C layer is mainly responsible for data encryption and decryption, integrity protection, data transmission, and the like on a control plane. The CU-UP is responsible for a user plane function, and mainly includes an SDAP layer and a PDCP-U layer. The SDAP layer is mainly responsible for processing data of a core network and mapping a flow (flow) to a bearer. The PDCP-U layer is mainly responsible for at least one function of encryption and decryption, integrity protection, header compression, serial number maintenance, data transmission, and the like on a data plane. Specifically, the CU-CP and the CU-UP are connected through a communication interface (for example, an E1 interface). The CU-CP represents an access network device and is connected to a core network device through a communication interface (for example, an Ng interface), and is connected to the DU through a communication interface (for example, an F1-C (control plane) interface). The CU-UP is connected to the DU through a communication interface (for example, an F1-U (user plane) interface).

In another possible implementation, the PDCP-C layer is also included in the CU-UP.

It may be understood that the foregoing protocol layer division between the CU and the DU, and protocol layer division between the CU-CP and the CU-UP are merely examples, and there may be another division manner. This is not limited in embodiments of this application.

The access network device mentioned in embodiments of this application may be a device including a CU or a DU, a device including a CU and a DU, or a device including a control plane CU node (a CU-CP node), a user plane CU node (a CU-UP node), and a DU node.

The access network device may be deployed on land, including indoor or outdoor and handheld or vehicle-mounted devices, may be deployed on a water surface, or may be deployed on an airplane, a balloon, and a satellite in the air. A scenario in which the access network device is located is not limited in this embodiment of this application.

Figure 2A:
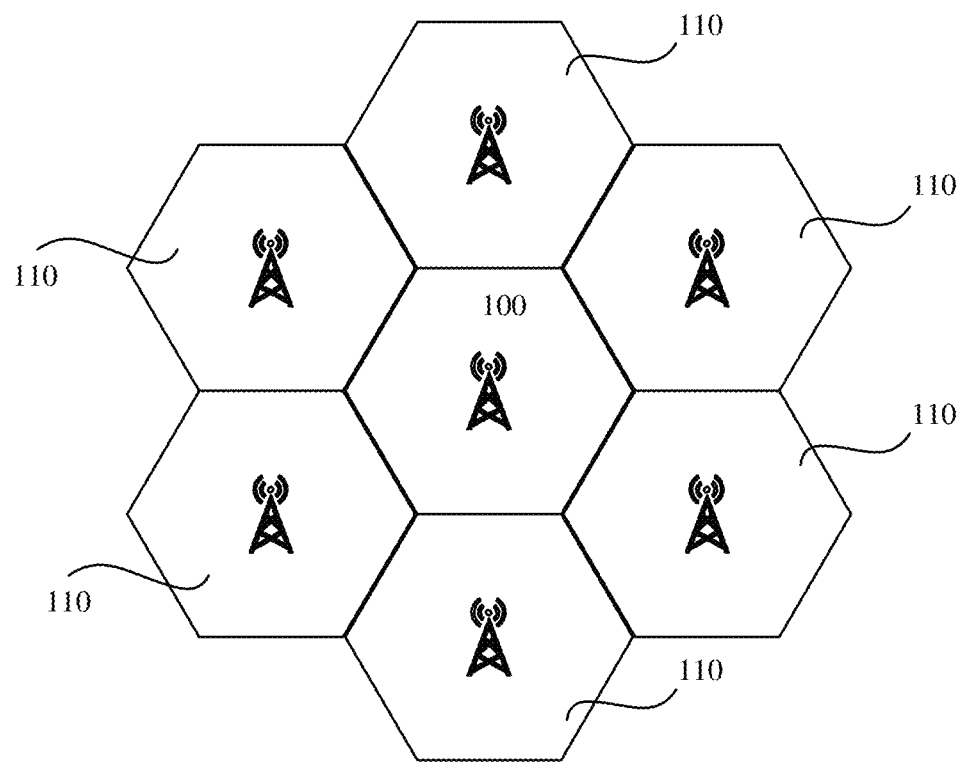
FIG. 2A is a schematic diagram of neighboring cells according to an embodiment of this application.

FIG. 2A is a schematic diagram of neighboring cells according to an embodiment of this application. As shown in FIG. 2A, a current cell 100 has six neighboring cells no. If an accurate location of a terminal is unknown, all the six neighboring cells of the current cell wo may be used as candidate cells. If the accurate location of the terminal is known, a few neighboring cells no on a moving direction side of the terminal may be used as the candidate cells. After the candidate cells are determined, the current cell 100 obtains identification information of a plurality of candidate cells, configuration parameters of the candidate cells, and conditions required for handover to the candidate cells, that is, conditional handover configurations. The conditional handover configurations may include signal strength, a transmission delay, a data rate, a cell type, and the like corresponding to handover to a target cell, and may further include a configuration parameter of a cell. The configuration parameter of the cell is used to indicate a cell parameter used for handover of a terminal to the target cell. In addition, the current cell 100 is connected to the terminal, and sends the conditional handover configurations to the terminal by using a network. When the terminal needs to perform cell handover, the terminal obtains a current measurement parameter, including measurement time, a measurement value, a measurement result threshold, and the like, and evaluates whether the current measurement parameter triggers a target conditional handover configuration in the conditional handover configuration. If the current measurement parameter triggers the target conditional handover configuration in the conditional handover configuration, the terminal selects, based on the target conditional handover configuration, a second cell in the candidate cells as the target cell to initiate an access request. In addition, in a conditional handover mechanism, before the terminal selects the second cell, the current cell 100 may send a resource request command to the plurality of candidate cells, so that the candidate cell prepares an access resource in advance according to the resource request command, and the terminal can successfully perform access when initiating the access request to the second cell in the candidate cells.

However, in the foregoing process, when the terminal is a terminal in flight, for example, a crewed aerial vehicle terminal, an uncrewed aerial vehicle (Unmanned Aerial Vehicle, UAV; or Airborne UE) terminal, or an air wearable device, or when a conventional terminal device, including a handheld device that has a wireless connection function, a vehicle-mounted device, or an internet of things device, is on a device in flight, because the terminal is in a moving state and has a specific flight-related parameter, including a flight height, a flight speed, a flight path, and the like, a communication environment of this type of terminal is greatly different from a communication environment of a common terminal, and a manner of determining the conditional handover configuration of this type of terminal is also different from a manner of determining the conditional handover configuration of the common terminal.

Figure 2B:
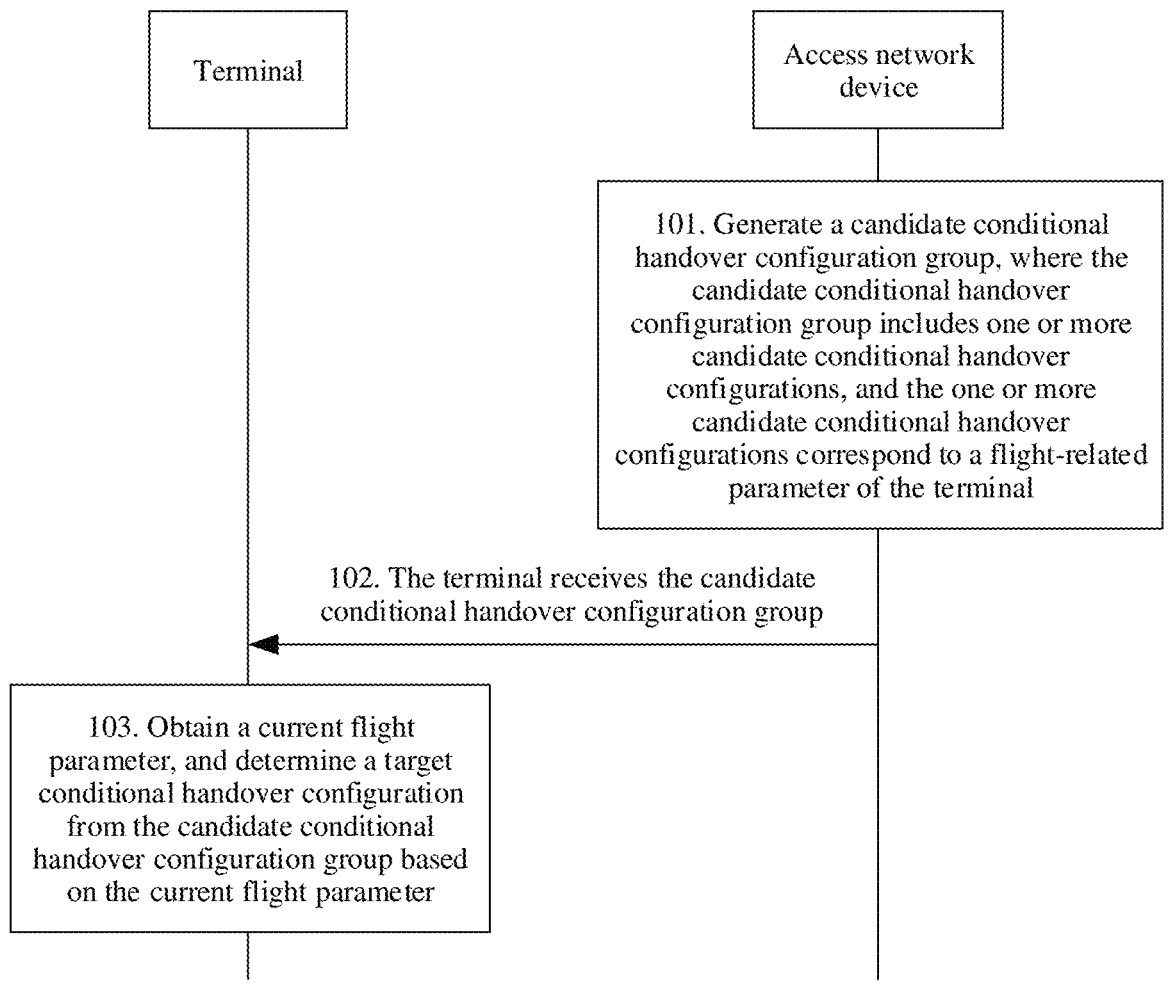
FIG. 2B is a schematic flowchart of a communication method according to an embodiment of this application.

In view of this, FIG. 2B is a schematic flowchart of a communication method according to an embodiment of this application. As shown in FIG. 2B, the method includes the following steps.

101. An access network device generates a candidate conditional handover configuration group, where the candidate conditional handover configuration group includes one or more candidate conditional handover configurations, and the one or more candidate conditional handover configurations correspond to at least one flight-related parameter of a terminal.

The conditional handover configuration group may also be referred to as a conditional handover configuration set.

The flight-related parameter of the terminal is a related parameter generated when the terminal moves irregularly different from a conventional ground terminal, and includes at least one of the following: a flight height parameter, a flight speed, a flight periodicity, a flight path, and the like. A first cell is a cell currently in communication connection with the terminal. In this embodiment of this application, the access network device is an execution device of the first cell, and the first cell performs any operation by using the access network device. Therefore, in related descriptions of operation execution, the first cell and the access network device may be replaced with each other. Similarly, another cell and another access network device may be replaced with each other in the related descriptions of operation execution. The operation may include communication connection, configuration generation, parameter obtaining, and the like. Before the terminal establishes a connection to the first cell, the access network device has not learned of the flight parameter of the terminal. In an optional manner, the access network device may use a default flight parameter or a flight-related parameter sent by another terminal device, and then generate the candidate conditional handover configuration group based on the flight-related parameter. The conditional handover configuration indicates a condition corresponding to handover of the terminal from the first cell to each candidate cell (a base station corresponding to a current cell or the candidate cell). The flight-related parameter may include a plurality of different values, ranges, or categories, and each different value, range, or category may correspond to a different conditional handover configuration. Therefore, the candidate conditional handover configuration group includes one or more candidate conditional handover configurations. After the terminal establishes the communication connection to the first cell, if the terminal needs to be handed over to a candidate cell, a condition based on which cell handover is performed needs to be first determined. That is, a target conditional handover configuration in the candidate conditional handover configuration group is obtained. In this embodiment of this application, a correspondence between a current flight parameter and the flight-related parameter may be used to trigger the target conditional handover configuration in the candidate conditional handover configuration group, and a target cell is determined based on the target conditional handover configuration.

After the terminal establishes a connection to the first cell, the access network device may generate the candidate conditional handover configuration group based on the flight-related parameter submitted by the terminal. A difference between the candidate conditional handover configuration group and a candidate conditional handover configuration group generated by the access network device based on the default flight-related parameter or the flight-related parameter sent by the another terminal device lies in that the candidate conditional handover configuration group is more personalized and targeted. In addition, if a next terminal connected to the first cell does not submit a new flight-related parameter, or a parameter of another terminal is similar to a parameter of a current terminal device, the flight-related parameter submitted by the current terminal or the candidate conditional handover configuration group generated based on the flight-related parameter may also be used in the another terminal connected to the first cell.

Optionally, the current flight parameter includes a current flight height, the flight-related parameter includes a flight height parameter, and the determining a target conditional handover configuration from the candidate conditional handover configuration group based on the current flight parameter includes: determining, based on a correspondence between the current flight height and the flight height parameter, the target conditional handover configuration from a candidate conditional handover configuration corresponding to the flight height parameter.

Figure 2C:
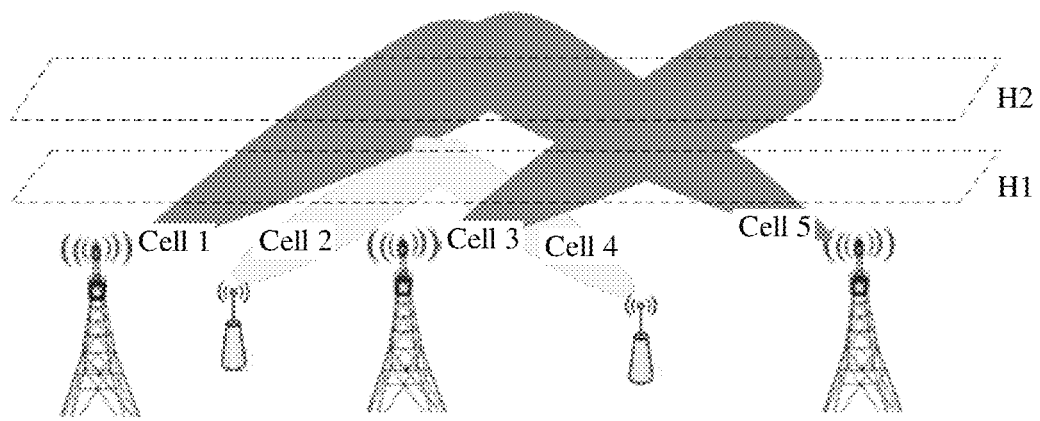
FIG. 2C is a schematic diagram of serving cell coverage at different heights according to an embodiment of this application.

In this embodiment of this application, an uncrewed aerial vehicle terminal UAV is used as an example of the terminal in flight. The UAV is flying in the air, and a serving cell seen by the UAV in the air may be different from a serving cell seen by common UE on the ground. FIG. 2C is a schematic diagram of serving cell coverage at different heights according to an embodiment of this application. As shown in FIG. 2C, in same network deployment, a cell topology seen on the ground may be greatly different from a cell topology seen in the air. This is because there are few obstacles in the air, and a signal side lobe of a remote base station may cover a nearby area. As shown in the figure, a cell 1 is on the ground, and a neighboring cell of the cell 1 is a cell 2. At a height H2, the neighboring cell of the cell 1 may be a cell 5 of the remote base station.

Figure 2D:
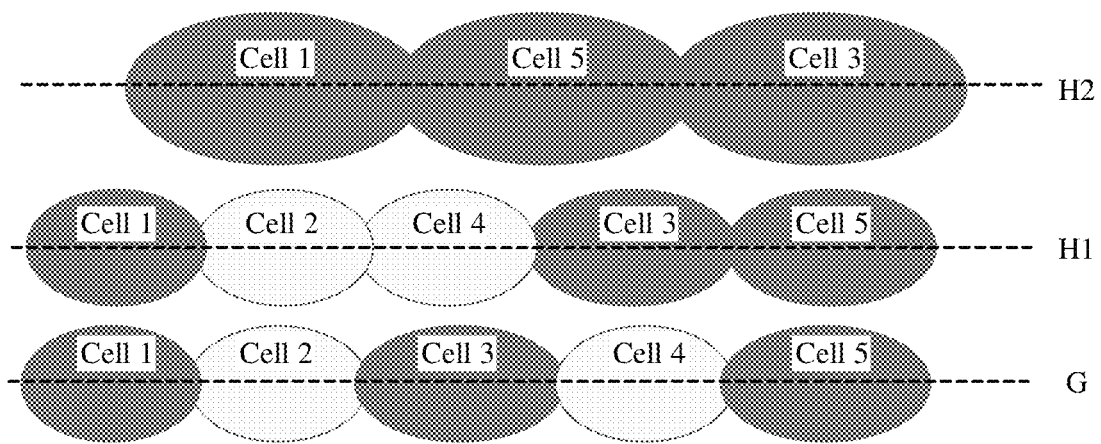
FIG. 2D is a schematic diagram of cell topologies at different heights according to an embodiment of this application.

Further, FIG. 2D is a schematic diagram of cell topologies at different heights according to an embodiment of this application. As shown in FIG. 2D, G represents the ground, H1 and H2 represent high heights, and H2>H1. A cell 3 is used as an example in the figure. Neighboring cells of the cell 3 on the ground are the cell 2 and a cell 4, the neighboring cells of the cell 3 at H1 are the cell 4 and a cell 5, and the neighboring cell of the cell 3 at H2 is the cell 5. Although the cell 3 is neighboring to the cell 5 at both H1 and H2, the cell 3 and the cell 5 have different coverage at H1 and H2. The foregoing differences all affect selection of a second cell of a network. For example, if UE is at H2, only the cell 1 and the cell 5 may be candidate cells for handover. If the UE is at H1, only the cell 2 and the cell 4 are candidate cells for handover. On G, the candidate cells are the cell 2 and the cell 3. In addition, a coverage area of the cell 2 at H1 is different from a coverage area of the cell 2 on G. Therefore, trigger conditions of handover should be different.

Based on the foregoing descriptions, when generating the conditional handover configuration of the UE, the access network device first needs to obtain the flight height parameter, which may be a plurality of flight height ranges, to generate a conditional handover configuration corresponding to the plurality of flight height ranges. The plurality of height ranges and the conditional handover configurations may be in a one-to-one correspondence, or may be in a one-to-many or many-to-one correspondence. This is not limited herein. Alternatively, the flight height parameter may be a flight height value and a preset difference, to generate a conditional handover configuration corresponding to the flight height value and the preset difference. The preset difference may be an absolute difference (which is unrelated to a positive or negative symbol), or may be a relative difference (which is related to a positive or negative symbol).

Optionally, the flight height parameter is the plurality of height ranges, and the determining, based on a correspondence between the current flight height and the flight height parameter, the target conditional handover configuration from a candidate conditional handover configuration group corresponding to the flight height parameter includes: obtaining a target height range, where the target height range is a height range corresponding to the current flight height; and obtaining a candidate conditional handover configuration corresponding to the target height range, and determining the candidate conditional handover configuration as the target conditional handover configuration.

The flight height parameter may be represented as the plurality of height ranges, as shown in Table 1.

TABLE 1

Table of a correspondence between a height range and a candidate conditional handover configuration group

| Index | Height range | Candidate conditional handover configuration group |
|---|---|---|
| 1 | H < Hg 1 | Candidate conditional handover configuration 1 |
| 2 | Hg 1 ≤ H < Hg 2 | Candidate conditional handover configuration 2 |
| 3 | H ≥ Hg 2 | Candidate conditional handover configuration 3 |

In Table 1, Hg 1 and Hg 2 are two thresholds, and Hg 1<Hg 2. Three height ranges are generated based on the two thresholds, and each height range corresponds to one candidate conditional handover configuration, to form a candidate conditional handover configuration group. The candidate conditional handover configuration corresponding to each height range may be completely different, or may be partially the same. For example, a measurement event and a measurement threshold in the candidate conditional handover configuration may be different based on heights, and heights may not be distinguished between in a base station list in a candidate cell, a candidate cell configuration, and the like. For example, in a conditional handover configuration corresponding to a height range<Hg 1, the measurement event is a base station signal strength, and the measurement threshold is Q. It indicates that when a height of the UE is less than Hg 1, a candidate cell whose signal strength is greater than Q dBm is selected from the candidate cells as the target cell. In a conditional handover configuration corresponding to the height range≥Hg 1 and <Hg 2, the measurement event is a transmission delay, and the measurement threshold is t. It indicates that when the height of the UE≥Hg 1 and <Hg 2, a candidate cell whose transmission delay is less than t ms is selected from the candidate cells as the target cell.

The correspondence between the height range and the candidate conditional handover configuration group shown in Table 1 may be a new candidate conditional handover configuration group generated based on the height range, or a candidate conditional handover configuration corresponding to the height range<Hg 1 may be an original conditional handover configuration corresponding to the ground UE. To be specific, N height thresholds are introduced, and space is divided into N+1 parts in height. A corresponding candidate conditional handover configuration group includes N+1 candidate conditional handover configurations, where an original conditional handover configuration is used for one candidate conditional handover configuration, and the other N candidate conditional handover configurations are additionally generated conditional handover configurations.

Optionally, the flight height parameter may be a flight height value and a preset difference, as shown in Table 2.

TABLE 2

Table of a correspondence between a height value and a candidate conditional handover configuration group

| Index | Flight height value | Preset difference | Candidate conditional handover configuration group |
|---|---|---|---|
| 1 | Hg 4 | Difference 1 | Candidate conditional handover configuration 4 |
| 2 | Hg 5 | Difference 2 | Candidate conditional handover configuration 5 |
| 3 | Hg 6 | Difference 3 | Candidate conditional handover configuration 6 |

The flight height values and the preset differences in Table 2 also form three different height ranges. If the preset difference is an absolute difference, a height range corresponding to the flight height value and the preset difference may be a range greater than a flight height value preset difference and less than a flight height value preset difference. For example, a height range corresponding to an index 1 is: Hg 4−difference 1H<Hg 4+difference 1. If the preset difference is a relative difference, a height range corresponding to the flight height value and the preset difference is a range greater than the flight height value preset difference, or a range less than the flight height value preset difference. For example, a height range corresponding to the index 1 is H<Hg 4+difference 1, or H>Hg 4+difference 1. The difference 1, the difference 2, and the difference 3 may be equal, or may be unequal. The candidate conditional handover configuration in the generated candidate conditional handover configuration group also corresponds to the height range. A difference between this embodiment and the embodiment corresponding to Table flies in that, after receiving the candidate conditional handover configuration group, the terminal determines the target conditional handover configuration from the candidate conditional handover configuration group in a different manner. For example, the target conditional handover configuration is selected from the candidate conditional handover configuration group corresponding to Table 1 based on a height range in which a current flight height of a UAV is located. The target conditional handover configuration is selected from the candidate conditional handover configuration group corresponding to Table 2 based on a value relationship between a height difference between the current flight height of the UAV and the flight height value and the preset difference.

It can be learned that in this embodiment of this application, the candidate handover configuration group generated based on the flight height parameter is a single-point configuration for use by the first cell. The access network device of the first cell sends the candidate conditional handover configuration group to the terminal connected to the access network device, and assists the terminal in determining the target cell. This can reduce a possibility that a conditional handover configuration generated for the terminal cannot meet a handover requirement of the terminal because the serving cell ignores a flight height of the terminal, and improve reliability of the conditional handover configuration.

Optionally, the flight-related parameter includes flight path information, the flight path information includes one or more flight points and flight point information corresponding to the flight point, and the flight point information is used to uniquely identify the flight point. The generating a candidate conditional handover configuration group includes: generating a candidate conditional handover configuration group corresponding to the flight point information.

In some cases, the UAV may report a flight path based on a request of a network. This is because for some UAV application scenarios, flight paths of the UAVs are planned in advance, and the UAV flies along a specified path. In this case, a serving cell of the UAV on the specified flight path may also be planned in advance, and a conditional handover configuration corresponding to the serving cell is sent to a UAV terminal. Alternatively, the UAV sequentially passes through a plurality of flight points on the specified flight path, an area corresponding to each flight point includes one or more serving cells, and the terminal establishes a connection to at least one of the serving cells. In this case, a conditional handover configuration of a serving cell that the terminal may access in the area may be generated in advance, and is sent to the UAV terminal. In a flight process of the UAV terminal, a corresponding conditional handover configuration is triggered as a flight parameter (a passing point) changes, to perform serving cell handover.

Figure 2E:
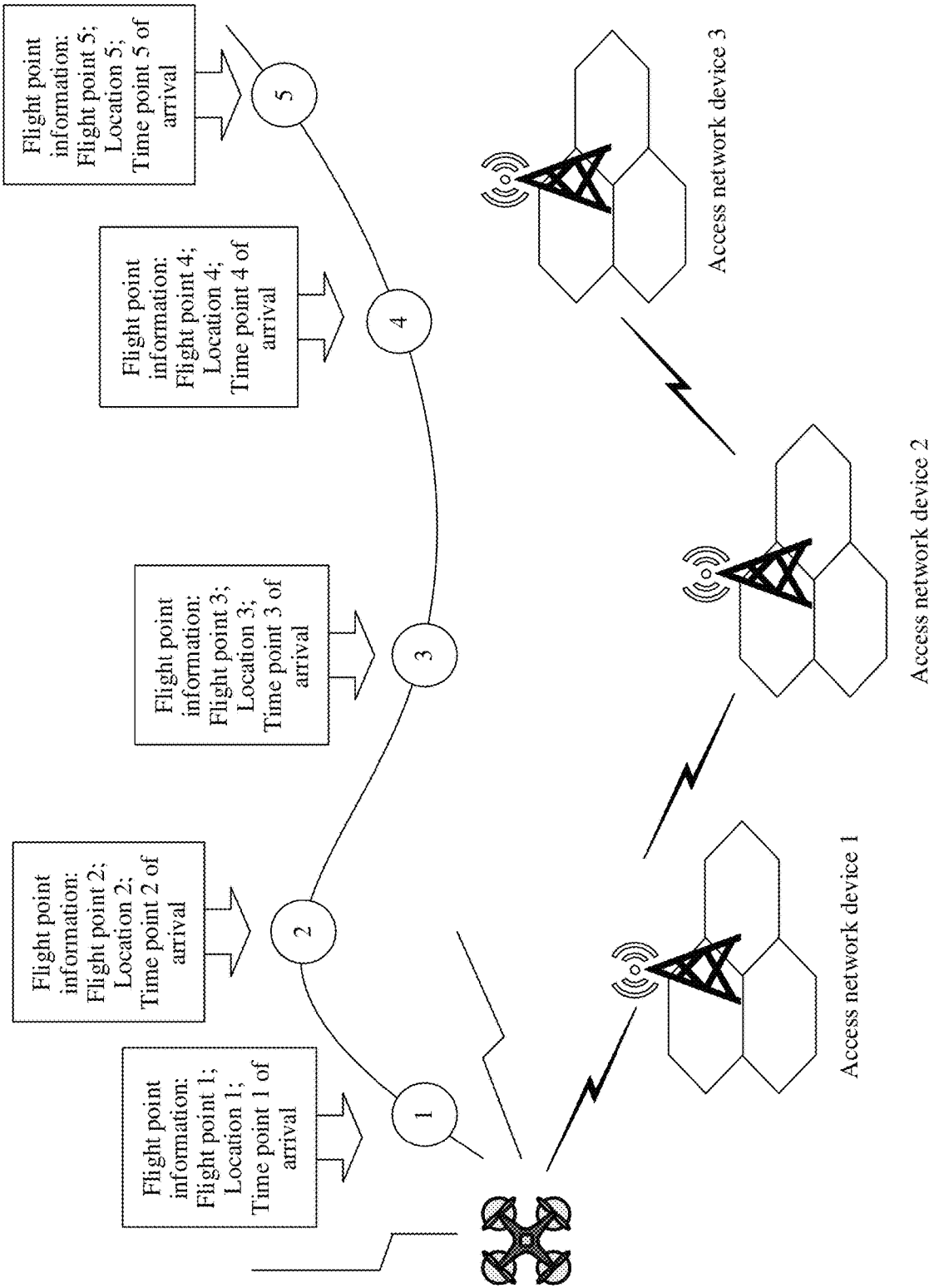
FIG. 2E is a schematic diagram of reporting a flight path by a terminal according to an embodiment of this application.

FIG. 2E is a schematic diagram of reporting a flight path by a terminal according to an embodiment of this application. As shown in FIG. 2E, the UAV is in communication connection with an access network device 1 corresponding to the first cell, and the UAV uploads flight path information (mainly including flight point information) of the UAV, for example, names of a plurality of flight points, a flight point location corresponding to each flight point, and a time point of arrival of each flight point. After receiving the flight path information uploaded by the UAV, the access network device of the first cell may generate a candidate conditional handover configuration group based on all or some information in the flight path information. For example, for the plurality of flight points, a candidate conditional handover configuration corresponding to each flight point may be generated based on the time point of arrival or the flight point location of each flight point, to form a candidate conditional handover configuration group. Then, the first cell sends the candidate conditional handover configuration group to the UAV terminal, so that the UAV terminal selects a target conditional handover configuration in the candidate conditional handover configuration group based on a current flight point parameter that is measured or obtained from another apparatus, and determines, based on the target conditional handover configuration, a second cell to which the terminal is to be handed over. In addition, the first cell generates a candidate conditional handover configuration group corresponding to each flight point in the UAV flight path. This means that candidate conditional handover configurations corresponding to all serving cells that may be accessed by the terminal in a flight point area on the UAV flight path are generated. The first cell sends in advance the candidate conditional handover configuration group to the serving cells that may be accessed by the UAV in all flight point areas on the UAV flight path, so that the serving cell initiates a resource request to a candidate cell of the serving cell, to prepare an access resource for the UAV in advance.

The candidate conditional handover configuration group generated based on the flight point information is shown in Table 3.

TABLE 3

Table of a relationship between flight point information and a candidate conditional handover configuration group

| Index | Flight point information | Candidate conditional handover configuration group |
|---|---|---|
| 1 | Flight point information 1 (Flight point 1) | Candidate conditional handover configuration 1 |
| 2 | Flight point information 2 (Flight point 2) | Candidate conditional handover configuration 2 |
| 3 | Flight point information 3 (Flight point 3) | Candidate conditional handover configuration 3 |

It can be learned from Table 3 that the candidate conditional handover configuration group is generated based on the flight point information, that is, a flight point is uniquely identified by using the flight point information. Then, a candidate conditional handover configuration corresponding to the flight point is generated. The flight point information may be a flight point name, a flight point number, an estimated time point of arrival of the flight point, a flight point location, or the like. The UAV flies along the flight path. Each time the UAV arrives at a flight point, a candidate conditional handover configuration corresponding to the flight point is triggered. The UAV selects, based on the candidate conditional handover configuration, a target cell to which the UAV is to be handed over. Assuming that a second cell in Table 3 is a current cell connected to the UAV, and the UAV terminal matches detected data information with the flight information, determines to fly to a location of the flight point 2, and triggers the candidate conditional handover configuration 2, the UAV selects the target cell from the candidate cells of the second cell based on the candidate conditional handover configuration 2, and initiates an access request to the target cell.

Optionally, the flight point information includes an estimated time point of arrival of each flight point, and the generating a candidate conditional handover configuration group corresponding to the flight point information includes: generating, based on the estimated time point of arrival of each flight point, a candidate conditional handover configuration corresponding to each flight point.

Specifically, the flight path information of the UAV includes the plurality of flight points. If the UAV flies along the flight path, the UAV arrives at a specified flight point at an estimated time point. For example, the UAV arrives at the flight point 2 at 12:00 at noon, and the UAV arrives at the flight point 3 at 14:00 p.m. Therefore, each estimated time point of arrival may be used to uniquely identify each flight point. In this case, when the candidate conditional handover configuration group is set, a conditional handover configuration corresponding to each flight point may be set based on the estimated time point of arrival of each flight point. Details are shown in Table 4.

TABLE 4

Table of a relationship between an estimated time point of arrival and a candidate conditional handover configuration group

| Index | Flight point information (Estimated time point of arrival) | Candidate conditional handover configuration group |
|---|---|---|
| 1 | Moment 1 (Flight point 1) | Candidate conditional handover configuration 1 |
| 2 | Moment 2 (Flight point 2) | Candidate conditional handover configuration 2 |
| 3 | Moment 3 (Flight point 3) | Candidate conditional handover configuration 3 |

The flight point information in Table 4 is the estimated time point of arrival of each flight point. If the UAV flies along a preset flight path, a correspondence is formed between the flight point and the estimated time point of arrival. That is, the estimated time point of arrival of each flight point may uniquely identify the flight point. Therefore, the candidate conditional handover configuration generated based on the estimated time point of arrival is also the candidate conditional handover configuration corresponding to each flight point. For example, if the estimated time point of arrival of the flight point 2 is the moment 2, the candidate conditional handover configuration 2 corresponding to the generated moment 2 is a candidate conditional handover configuration corresponding to the flight point 2.

Optionally, the flight point information includes a flight point location of each flight point, and the generating a candidate conditional handover configuration group corresponding to the flight point information includes: generating, based on the flight point location of each flight point, the candidate conditional handover configuration corresponding to each flight point.

Similarly, if the UAV flies based on fixed flight path information, the UAV flies over a fixed flight point, and each flight point has a corresponding flight point location. Therefore, the flight point location may also be used to uniquely identify each flight point. In this case, when the candidate conditional handover configuration group is set, a conditional handover configuration corresponding to each flight point may be set based on the flight point location of each flight point. Details are shown in Table 5.

TABLE 5

Table of a relationship between a flight point location and a candidate conditional handover configuration group

| Index | Flight point location | Candidate conditional handover configuration group |
|---|---|---|
| 1 | Location 1 (Flight point 1) | Candidate conditional handover configuration 1 |
| 2 | Location 2 (Flight point 2) | Candidate conditional handover configuration 2 |
| 3 | Location 3 (Flight point 3) | Candidate conditional handover configuration 3 |

The flight point information in Table 5 is a flight point location of each flight point, and the flight point location of each flight point may uniquely identify the flight point. Therefore, the candidate conditional handover configuration generated based on the flight point location is also the candidate conditional handover configuration corresponding to each flight point. The flight point location may be a location marked by longitude and latitude, for example, the location 1 is (39° north latitude, 116° east longitude); or is a prominent geographical location name, for example, Beijing; or may be a location marked by longitude and latitude and a height, where for example, the location 1 is (39° north latitude, 116° east longitude, 1000 m above the sea level). The generated candidate conditional handover configuration 1 corresponding to the location 1 is a candidate conditional handover configuration corresponding to the flight point 1.

Optionally, the flight point information includes the flight point location and the estimated time point of arrival of each flight point, and the generating a candidate conditional handover configuration group corresponding to the flight point information includes: generating, based on the flight point location and the estimated time point of arrival of each flight point, the candidate conditional handover configuration corresponding to each flight point.

It can be learned from the foregoing descriptions that the UAV flight path information includes the flight point information, and the flight point information may include one parameter of the flight point location or the estimated time point of arrival of each flight point, or may include both of the two parameters. That is, each flight point is uniquely identified by both the flight point location and the estimated time point of arrival. Details are shown in Table 6.

TABLE 6

Table of a relationship between a flight point location, an estimated time point of arrival, and a candidate conditional handover configuration group

| | Flight point information | | | Candidate conditional handover configuration group |
|---|---|---|---|---|
| Index | Flight point location | Estimated time point of arrival | (Flight point) | |
| 1 | Location 1 | Moment 1 | (Flight point 1) | Candidate conditional handover configuration 1 |
| 2 | Location 2 | Moment 2 | (Flight point 2) | Candidate conditional handover configuration 2 |
| 3 | Location 3 | Moment 3 | (Flight point 3) | Candidate conditional handover configuration 3 |

The flight point information in Table 6 is the flight point location of each flight point and the estimated time point of arrival of the flight point. The flight point is jointly identified based on the flight point location and the estimated time point of arrival, and a candidate conditional handover configuration corresponding to the flight point location and the estimated time point of arrival is generated as the candidate conditional handover configuration corresponding to each flight point. In this process, two parameters are used to jointly identify each flight point, so that a correspondence between the candidate conditional handover configuration and the flight point can be more accurate. That is, the UAV is considered to fly along a preset flight path and the candidate conditional handover configuration group generated based on the flight path information is used to select a target cell for access for the UAV, only when the UAV arrives at a specified flight point location at the estimated time point of arrival.

Optionally, the flight path information further includes a flight height parameter, and the generating a candidate conditional handover configuration group corresponding to the flight point information includes: generating, based on the flight point information of each flight point and the flight height parameter, the candidate conditional handover configuration group corresponding to each flight point, to form the candidate conditional handover configuration group corresponding to the flight point information.

Similarly, when the access network device sets, for the terminal in advance by using a preset flight path submitted by the terminal, candidate conditional handover configuration groups corresponding to all flight points, the flight height parameter may also be considered. Different terminals may have different flight height parameters in high heights based on a model difference, a mission difference, or another reason. In this case, when flying at different flight heights in a same flight point range, the terminal may also select different conditional handover configurations. The flight height parameter is different from a height parameter that may be included in the flight point location in the foregoing flight point information. The height parameter in the flight point location is used to further determine whether a target flight point is matched. The height parameter is a fixed value, for example, the location 1 that is mentioned in the foregoing content and that is 1000 m above the sea level. If a height is specified for each flight point, that is, it is considered that the UAV flies along the preset flight path only when the UAV flies to a specified height, a target cell is selected for the terminal based on a preset candidate conditional handover configuration group. The flight height parameter herein is a flight height that can be selected by the terminal in a flight process, and is a variable value.

Each flight point in the preset flight path corresponds to some possible flight-related parameters of the terminal. Therefore, a candidate conditional handover configuration group corresponding to each flight point is generated based on the flight point information of each flight point and the flight height parameter corresponding to the flight point, to form candidate conditional handover configuration groups corresponding to all flight point information. Details are shown in Table 7.

TABLE 7

Table of a relationship between flight point information and a candidate conditional handover configuration group

| Index | Flight point information | Flight height parameter | Candidate conditional handover configuration group |
|---|---|---|---|
| 1 | Flight point information 1 (Flight point 1) | H < Hg 1 | Candidate conditional handover configuration 11 |
| | | Hg 1 ≤ H < Hg 2 | Candidate conditional handover configuration 12 |
| | | H ≥ Hg 2 | Candidate conditional handover configuration 13 |
| 2 | Flight point information 2 (Flight point 2) | H < Hg 3 | Candidate conditional handover configuration 21 |
| | | Hg 3 ≤ H < Hg 4 | Candidate conditional handover configuration 22 |
| | | H ≥ Hg 4 | Candidate conditional handover configuration 23 |
| 3 | Flight point information 3 (Flight point 3) | H < Hg 5 | Candidate conditional handover configuration 31 |
| | | Hg 5 ≤ H < Hg 6 | Candidate conditional handover configuration 32 |
| | | H ≥ Hg 6 | Candidate conditional handover configuration 33 |

In Table 7, the flight point information includes one or more of a flight point name, a flight point number, an estimated time point of arrival of a flight point, or a flight point location described in the foregoing content, and is used to uniquely identify each flight point. In addition, the flight path information further includes the flight height parameter corresponding to each flight point. For each flight point, candidate conditional handover configurations corresponding to different flight height parameters of the flight point are generated based on a neighboring relationship or a coverage relationship of a serving cell at different heights of the flight point. The flight height parameter may be represented as a height range, a height threshold, a height difference, or the like. Flight height parameter corresponding to each flight point may be the same. For example, in Table 7, Hg 1=Hg 3=Hg 5, and Hg 2=Hg 4=Hg 6. In some cases, flight heights that can be selected by the terminal may be different because an environment and a climate of each flight point are different. Therefore, the flight height parameter corresponding to each flight point may also be different, that is, the foregoing equation relationship does not exist. A corresponding candidate conditional handover configuration group is generated for each flight point. In Table 7, the candidate conditional handover configurations 11 to 13 are candidate conditional handover configuration groups corresponding to the flight point 1, the conditional handover configurations 21 to 23 are candidate conditional handover configuration groups corresponding to the flight point 2, and the conditional handover configurations 31 to 33 are candidate conditional handover configuration groups corresponding to the flight point 3. Quantities of candidate conditional handover configurations in the candidate conditional handover configuration groups corresponding to different flight points may be the same, for example, all the quantities are three in Table 7, or may be different.

It can be learned that in this embodiment of this application, the candidate conditional handover configuration group generated based on the flight path information is a multi-point configuration for use by the first cell and a serving cell that may be connected to the terminal in the flight path. The access network device of the first cell sends the configuration group to the terminal connected to the access network device, so that the terminal obtains, based on the configuration group, a target cell to which the terminal is to be handed over. Similarly, the first cell sends the configuration group to the target cell, and the target cell continues to use the configuration group to obtain a candidate cell access resource for the terminal. After accessing the target cell, the terminal continues to select a next target cell based on the configuration group. In this process, a candidate conditional handover configuration may be generated and an access resource may be prepared in advance for the terminal, so that the terminal quickly completes cell handover. In addition, when the flight path information includes both the flight height parameter and the flight point information, candidate conditional handover configuration groups corresponding to different height parameters of all flight points in the preset flight path are generated in advance, so that the terminal can more quickly and accurately complete a cell handover process.

In addition, in the foregoing embodiment, the access network device of the first cell may send the candidate conditional handover configuration group to the terminal by using radio resource control (RRC) dedicated signaling, physical layer signaling, or MAC layer signaling. The RRC dedicated signaling can prevent a data loss and data tampering, and further ensures security and real-time performance in an information transmission process. Alternatively, the access network device may send the candidate handover conditional configuration group to another access network device. The another access network device may be an access network device to which the second cell to which the terminal expects to be handed over belongs, or may be an access network device to which another serving cell belongs.

It should be noted that the candidate conditional handover configuration group generated by the first cell based on the flight path information uploaded by the terminal is generated for a plurality of serving cells that the flight path of the terminal may pass through or a plurality of serving cells in an area corresponding to each of a plurality of flight points. Therefore, the plurality of serving cells may find, from the candidate conditional handover configuration group, candidate conditional handover configurations corresponding to the plurality of serving cells. The first cell transfers the candidate conditional handover configuration group to the plurality of serving cells in a broadcast manner. Alternatively, the first cell may send the candidate conditional handover configuration group to the second cell, and then the second cell sends the candidate conditional handover configuration group to another cell, to complete propagation of the candidate conditional handover configuration group between the plurality of serving cells. After the plurality of serving cells receive the candidate conditional handover configuration group, if the terminal flies along the flight path, the serving cell may continue to use the candidate conditional handover configuration group. If the flight path of the terminal deviates or another condition changes, the serving cell may generate a new candidate conditional handover configuration for cell handover of the terminal, and the serving cell may release the candidate conditional handover configuration group sent by the first cell.

It can be learned that in this embodiment of this application, the first cell generates, by using the received flight-related parameter, the candidate conditional handover configuration group corresponding to the terminal, so that comprehensiveness and integrity of the generated candidate conditional handover configuration are improved, and integrity of the candidate cell access resource prepared by the first cell for the terminal based on the candidate conditional handover configuration group is improved.

102. The terminal receives the candidate conditional handover configuration group from the access network device of the first cell.

103. The terminal obtains the current flight parameter, and determines the target conditional handover configuration from the candidate conditional handover configuration group based on the current flight parameter. The target conditional handover configuration is used to determine a second cell that the terminal expects to access.

The second cell expected to be accessed herein may also be referred to as a second cell that is to be accessed or a second cell to which handover is to be performed.

The first cell generates the candidate conditional handover configuration group and sends the candidate conditional handover configuration group to the terminal. The terminal selects, based on the current flight parameter obtained by the terminal, a target conditional handover configuration, and determines, based on the target conditional handover configuration, the second cell that is expected to be accessed. A case in which the terminal selects the target conditional handover configuration may include: The terminal selects the target conditional handover configuration from the candidate conditional handover configuration group based on a fixed periodicity T; the terminal selects the target conditional handover configuration from the candidate conditional handover configuration group based on received signaling for cell handover; the terminal selects, based on the obtained current flight parameter, the target conditional handover configuration from the candidate conditional handover configuration group; or the like.

When the terminal selects the target conditional handover configuration from the candidate conditional handover configuration group, because generation of the candidate conditional handover configuration group is closely associated with the flight-related parameter, the terminal may match the current flight parameter with the flight-related parameter in each candidate conditional handover configuration, and determine, based on a matching result, a target candidate conditional handover configuration that matches the current flight parameter of the terminal.

Optionally, the current flight parameter includes a current flight height, the flight-related parameter includes a flight height parameter, and the determining a target conditional handover configuration from the candidate conditional handover configuration group based on the current flight parameter includes: determining, based on a correspondence between the current flight height and the flight height parameter, the target conditional handover configuration from a candidate conditional handover configuration group corresponding to the flight height parameter.

It can be learned from the descriptions in step 101 that the first cell can generate the plurality of candidate conditional handover configurations based on the flight height parameter of the terminal. In this case, the terminal can match the current flight height with the flight height parameter, to select a candidate conditional handover configuration that adapts to the current flight height and that is in the plurality of candidate conditional handover configurations. Assuming that the flight height parameter is a plurality of height ranges, the target conditional handover configuration may be selected based on a height range in which the current flight height is located. Assuming that the flight height parameter is a threshold, the target conditional handover configuration may be determined based on a value relationship between the current flight height and the threshold. Assuming that the flight height parameter is one or more thresholds and a preset difference, the target conditional handover configuration may be determined based on a value relationship between a difference between the current flight height and the threshold and the preset difference.

Optionally, the flight height parameter is the plurality of height ranges, and the determining, based on a correspondence between the current flight height and the flight height parameter, the target conditional handover configuration from a candidate conditional handover configuration group corresponding to the flight height parameter includes: obtaining a target height range, where the target height range is a height range corresponding to the current flight height; and obtaining a candidate conditional handover configuration corresponding to the target height range, and determining the candidate conditional handover configuration as the target conditional handover configuration.

Figure 2F:
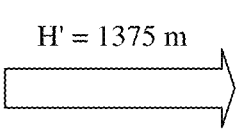
FIG. 2F is a schematic diagram of a process of determining a target conditional handover configuration according to an embodiment of this application.

FIG. 2F is a schematic diagram of a process of determining a target conditional handover configuration according to an embodiment of this application. As shown in FIG. 2F, after detecting a current flight height, a terminal may match the current flight height with a plurality of height ranges corresponding to a conditional handover configuration group, use the height range to which the current flight height belongs as a target range, and obtain a conditional handover configuration corresponding to the target range as the target conditional handover configuration. In FIG. 2F, a current flight height H'=1375 m. After matching is performed, it is determined that a range to which the current flight height belongs is a range 1000 m H≤HH<1500 m. The range corresponds to a candidate conditional handover configuration 2, and is used as the target conditional handover configuration of the terminal.

It can be learned that in this embodiment of this application, the terminal matches the flight height parameter corresponding to the current flight height, and obtains the target conditional handover configuration corresponding to the flight height parameter. Then, the terminal determines a target cell based on the target conditional handover configuration. This can reduce a case in which the terminal cannot correctly establish a connection to a candidate cell based on a conditional handover configuration because the terminal flies at different heights, and improve efficiency of cell handover of the terminal.

In addition, after the terminal accesses the second cell based on the candidate conditional handover configuration group generated by the first cell, the second cell may generate an update candidate conditional handover configuration group and send the update candidate conditional handover configuration group to the terminal. The terminal performs next serving cell handover based on the update candidate conditional handover configuration group. Therefore, the candidate conditional handover configuration group stored by the terminal may be released in a serving cell handover process (including after determining the second cell and before connecting to the second cell, after accessing the second cell, or after receiving the update candidate conditional handover configuration group generated by the second cell), or may be released based on a received update candidate conditional handover configuration group sent by another serving cell, to reduce memory consumption of the terminal.

In addition, after receiving the candidate conditional handover configuration group, the terminal may further start a validity timer. That is, the terminal specifies that the candidate conditional handover configuration group is valid within preset duration. If the preset duration is exceeded, the candidate conditional handover configuration group is invalid. Optionally, the terminal releases the invalid candidate conditional handover configuration group. Alternatively, the access network device of the first cell may release the candidate conditional handover configuration group, including releasing the candidate conditional handover configuration group after successfully sending the candidate conditional handover configuration group to the terminal, releasing the candidate conditional handover configuration group after the terminal completes serving cell handover, or releasing the candidate conditional handover configuration group after receiving a related indication.

Optionally, the flight-related parameter includes flight path information, the flight path information includes flight point information of each of one or more flight points, the one or more flight points are in a one-to-one correspondence with the one or more candidate conditional handover configurations, and the current flight parameter includes a current flight point parameter. The determining a target conditional handover configuration from the candidate conditional handover configuration group based on the current flight parameter includes: determining a target flight point from the one or more flight points based on a matching relationship between the current flight point parameter and the flight point information; and obtaining, from a candidate conditional handover configuration group corresponding to the flight point, a candidate conditional handover configuration corresponding to the target flight point as the target conditional handover configuration.

Similarly, step 101 describes how to generate, by using the flight point information in the flight path information, the candidate conditional handover configuration group corresponding to the flight point. The flight point information includes one or more of a flight point name, a flight point number, an estimated time point of arrival of the flight point, and a flight point location. If the terminal flies along a preset flight path, when obtaining the current flight point parameter, the terminal compares or matches the current flight point parameter with the flight point information. If the matching succeeds, it is determined that the flight point corresponding to the flight point information is the target flight point in the flight path at which the terminal arrives, and the target conditional handover configuration corresponding to the target flight point may be obtained as the conditional handover configuration of the terminal. The current flight point parameter may also be one or more of the flight point name, the flight point number, the estimated time point of arrival of the flight point, and the flight point location. The parameters may be measured by the terminal in real time, or may be sent by a serving cell or a terminal device that communicates with the terminal in real time.

In some cases, the current flight point parameter may fail to match any flight point information, and it indicates that the terminal does not fly along the preset flight path, or the terminal has not arrived near any flight point. In this case, the terminal may request a currently connected serving cell to generate a new conditional handover configuration and send the new conditional handover configuration to the terminal. Alternatively, the terminal may match the current flight point parameter with the flight point information again after continuing flying for specific time or a specific distance.

Optionally, the current flight point parameter includes a current system time point, and the flight point information includes an estimated time point of arrival. The determining a target flight point from the one or more flight points based on a matching relationship between the current flight point parameter and the flight point information of each of the one or more flight points includes: obtaining a target time point, where the target time point is a time point that matches the current system time point in the estimated time point of arrival; and using a flight point corresponding to the target time point as the target flight point.

It can be learned from the foregoing descriptions that, when the target conditional handover configuration is determined based on the current flight point parameter, the target flight point may be first determined, and then the target conditional handover configuration is determined based on the target flight point. It is assumed that the current flight parameter is the current system time point. After obtaining the current system time point, the terminal matches the current system time point with a plurality of estimated time points of arrival corresponding to the conditional handover configuration group. If the matching succeeds, a flight point corresponding to the estimated time point of arrival is used as the target flight point at which the terminal currently arrives. The current system time point may be obtained by the terminal when synchronously communicating with the satellite, or may be sent by another apparatus or device to the terminal.

When the current system time point is completely the same as an estimated time point of arrival, or when a difference between the current system time point and an estimated time point of arrival is less than a preset difference, or provided that the current system time point and an estimated time point of arrival meet a specific value relationship, it is determined that the matching succeeds.

Figure 2G:
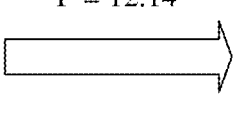
FIG. 2G is another schematic diagram of a process of determining a target conditional handover configuration according to an embodiment of this application.

FIG. 2G is another schematic diagram of a process of determining a target conditional handover configuration according to an embodiment of this application. As shown in FIG. 2G, it is assumed that a method for determining that matching succeeds is that a difference between a current system time point and an estimated time point of arrival is less than a preset difference, the preset difference r=20 min (minutes), and the current system time point is 12:14, the difference between the current system time point and the estimated time point of arrival is r'=112:14−12:001=14 min<r. Therefore, it may be determined that the current system time point successfully matches the estimated time point of arrival of a flight point 2, and the flight point 2 is determined as a target flight point.

Optionally, the current flight point parameter includes a current flight location, and the flight point information includes a flight point location. The determining a target flight point from the one or more flight points based on a matching relationship between the current flight point parameter and the flight point information of each of the one or more flight points includes: obtaining a target flight point location, where the target flight point location is a location that matches the current flight location in the flight point location; and using a flight point corresponding to the target flight point location as the target flight point.

For a terminal in flight, for example, a UAV, a flight location constantly changes in a flight process. The flight location may be a prominent place name, a location marked by using longitude and latitude, or a location marked by using longitude and latitude and a height. The current flight location of the terminal may be measured and obtained by the terminal in real time, or may be obtained from another apparatus or device. If the UAV flies along a preset flight path, the UAV passes a fixed flight point location. If the current flight location of the terminal successfully matches the flight point location, it may be determined that the terminal flies to a target flight point corresponding to the flight point location. A conditional handover configuration corresponding to the target flight point, that is, a conditional handover configuration currently required by the terminal, is obtained.

A method for determining that the current flight location and the flight point location are successfully matched includes: A distance between the current flight location and the flight point location is less than a preset distance. Usually, the distance between the current flight location and the flight point location represents a straight-line distance in the air, a spherical distance on a map, or a ground distance between cells; the current flight location and the flight point location are in a same prominent place name range; the current flight location and the flight point location have same longitude and latitude coordinates; and the current flight location and the flight point location have same longitude and latitude coordinates and a same height.

Figure 2H:
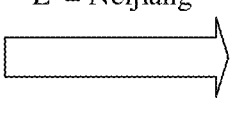
FIG. 2H is still another schematic diagram of a process of determining a target conditional handover configuration according to an embodiment of this application.

FIG. 2H is still another schematic diagram of a process of determining a target conditional handover configuration according to an embodiment of this application. As shown in FIG. 2H, a flight point location in a flight path is identified by using a prominent place name, including Longquan, Ziyang, and Neijiang. Similarly, a current flight location obtained by the terminal is also a place name, that is, Neijiang. The current flight location successfully matches "Neijiang" in the flight point location, and the flight point location corresponds to a flight point 3. The flight point is determined as a target flight point.

Optionally, the current flight point parameter includes a current system time point and a current flight location, and the flight point information includes an estimated time point of arrival and a flight point location. The determining a target flight point from the one or more flight points based on a matching relationship between the current flight point parameter and the flight point information of each of the one or more flight points includes: obtaining a target time point, where the target time point is a time point that matches the current system time point in the estimated time point of arrival; obtaining a flight point location corresponding to the target time point, and determining whether the flight point location matches the current flight location; and when the flight point location successfully matches the current flight location, determining a flight point corresponding to the flight point location as the target flight point.

Figure 2I:
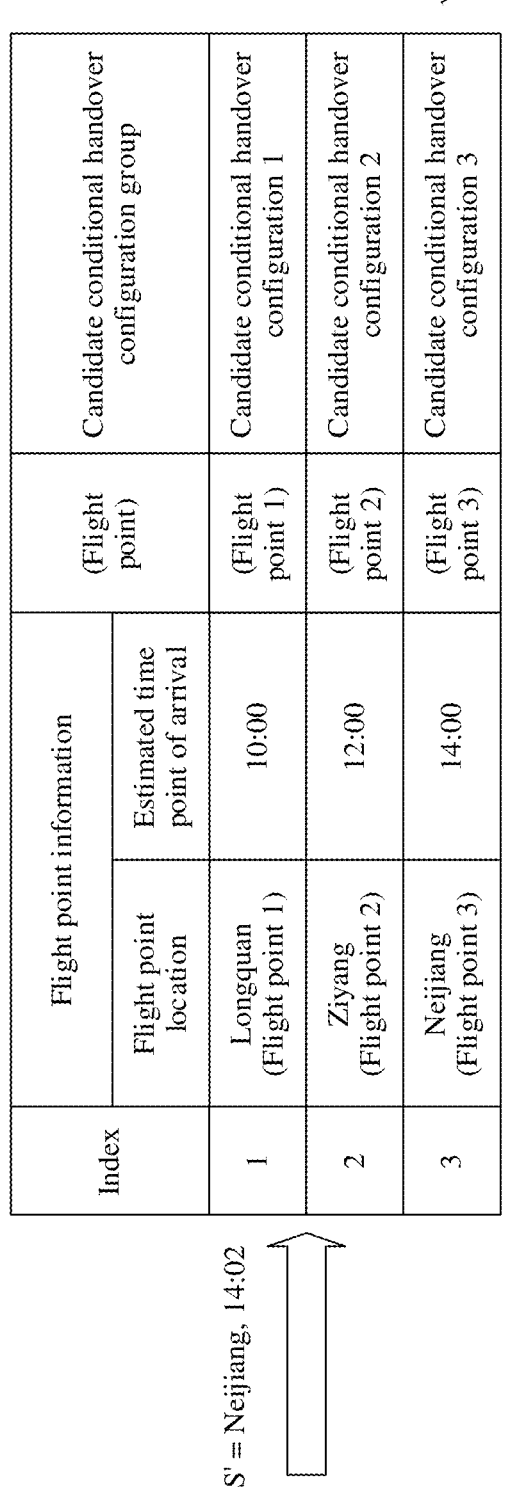
FIG. 2I is yet another schematic diagram of a process of determining a target conditional handover configuration according to an embodiment of this application.

A flight point in a flight path of a flight terminal may be identified by using both the flight point location and the estimated time point of arrival. FIG. 2I is yet another schematic diagram of a process of determining a target conditional handover configuration according to an embodiment of this application. As shown in FIG. 2I, a flight point 1 is identified by using (the flight point location, the estimated time point of arrival)=(Longquan, 10:00). That is, it is determined that the terminal flies along a preset flight path and passes the flight point 1, only when a UAV arrives at Longquan at 10:00 a.m.

In this case, when determining the target flight point through matching based on the current flight point parameter, the UAV may match both the flight point location and the estimated time point of arrival that correspond to the target flight point. Therefore, the current flight point parameter may be the current system time point and the current flight location. As shown in FIG. 2I, a current flight point parameter S'=(the current flight location, the current system time point)=(Neijiang, 14:02), and is matched with the flight point information. First, the current flight location is matched with the flight point location, where the flight point location includes Neijiang, and the matching succeeds. Then, the current system time point is matched with an "estimated time point of arrival" corresponding to the flight point location "Neijiang", that is, for matching between 14:00 and 14:02. Assuming that a condition for successful matching is that a difference between the current time point and the estimated time point of arrival is less than 20 min, the current system time point and the estimated time point of arrival of the flight point location successfully match, and the target flight point is determined as a flight point 3. In this process, matching between the current system time point and the estimated time point of arrival may be first performed, and then matching between the flight location and the current flight location is performed. A matching sequence is not limited in this embodiment of this application.

It can be learned that in this embodiment of this application, the terminal matches the target flight point based on the current flight point parameter, including the current system time point, the current flight location, or a combination thereof, and then obtains the candidate conditional handover configuration corresponding to the target flight point as the target conditional handover configuration used by the terminal to determine a target cell. The candidate conditional handover configuration prepared in advance can effectively improve efficiency of selecting and accessing the target cell by the terminal.

In the foregoing processes in FIG. 2G to FIG. 2I, provided that the target flight point is determined, the candidate conditional handover configuration corresponding to the target flight point may be obtained as the target conditional handover configuration. Then, the terminal performs cell handover based on the target conditional handover configuration. For example, in FIG. 2G, if it is determined that the target flight point is a flight point 2, a candidate conditional handover configuration 2 corresponding to the flight point 2 is the target conditional handover configuration. In FIG. 2H and FIG. 2I, if it is determined that the target flight point is a flight point 3, a candidate conditional handover configuration 3 corresponding to the flight point 3 is the target conditional handover configuration.

However, in some cases, one target flight point may correspond to a plurality of candidate conditional handover configurations, for example, for terminal models and terminal sizes in different flights, different flight point density degrees in different flight paths, different communication requirements of the terminals, and different flight heights of the terminals. In this case, even if the target flight point is determined, a final target conditional handover configuration in the target flight point may be further determined by using another parameter.

Optionally, the flight path information further includes a flight height parameter corresponding to each flight point, and the current flight parameter includes a current flight height. The using a candidate conditional handover configuration corresponding to the target flight point as the target conditional handover configuration includes: obtaining a target height of the target flight point, where the target height is a flight height parameter that matches the current flight height; and determining the target conditional handover configuration from the candidate conditional handover configuration group based on the target height.

The flight path uploaded by the terminal includes a plurality of flight points, and each flight point has a corresponding flight height parameter. The flight height parameter indicates a flight height that the terminal can select when flying at each flight point or in a flight point range. When the terminal flies at different flight heights, due to differences in neighboring relationships and coverage areas between cells, the terminal may correspond to different candidate conditional handover configurations. Therefore, a candidate conditional handover configuration of each flight point is a candidate conditional handover configuration group including a plurality of candidate conditional handover configurations, and each candidate conditional handover configuration in the group corresponds to a combination of the flight point information and the flight height parameter.

FIG. 2J is still yet another schematic diagram of a process of determining a target conditional handover configuration according to an embodiment of this application. As shown in FIG. 2J, a candidate conditional handover configuration group corresponding to a flight point 1 includes candidate conditional handover configurations 11 to 13, and the candidate conditional handover configurations 11 to 13 are in a one-to-one correspondence with flight point information 1 and a combination of three height ranges of the flight point 1. For example, a combination of (flight point information 1, H<1000 m) corresponds to the candidate conditional handover configuration 11. Similarly, each candidate conditional handover configuration in the candidate conditional handover configuration groups corresponding to a flight point 2 and a flight point 3 is also in a one-to-one correspondence with the flight point information and the combination of the height ranges. Certainly, alternatively, one piece of flight point information and a combination of a plurality of height ranges may be corresponding to a same conditional handover configuration.

The terminal obtains a current flight parameter, including a current flight point parameter and a current flight height. The current flight point parameter is used to match flight point information of each flight point, to determine a target flight point that the terminal currently arrives. The current flight height is used to match the flight height parameter, to determine a current flight height range of the terminal, and finally determine a target conditional handover configuration required by the terminal. As shown in FIG. 2J, the current flight point parameter is the flight point information 1, it is determined that the target flight point is the flight point 1. The current flight height is 1375 m, it is determined that the current flight height range of the terminal is 1000 m≤H<1500 m. Finally, it is determined that the target conditional handover configuration corresponding to the terminal is the candidate conditional handover configuration 12.

It can be learned that in this embodiment of this application, the candidate conditional handover configuration corresponding to a target height in the target flight point may be matched based on the current flight point parameter and the current flight height. The candidate conditional handover configuration is used as the target conditional handover configuration, so that when the terminal is handed over between cells, the terminal can also obtain an accurate corresponding conditional handover configuration for a candidate cell difference existing at different heights of the target flight point while flight point correspondence is considered. In this way, accuracy of the target conditional handover configuration obtained by the terminal is improved, and efficiency of performing cell handover by the terminal is improved.

In addition, if the candidate conditional handover configuration groups that are sent by the first cell and that are received by the terminal are generated based on the flight path information, the candidate conditional handover configuration groups are forward-looking and persistent to some extent. When the terminal flies along the preset flight path, the terminal may retain the candidate conditional handover configuration group. Alternatively, when the terminal passes through a cell, if the cell sends an update candidate conditional handover configuration group to the terminal, it indicates that the terminal may deviate from an original flight track. In this case, the terminal may release the candidate conditional handover configuration group previously sent by the first cell.

In the foregoing embodiments, "≥" or "≤" represents "greater than or equal to" and "less than or equal to". "Equal to" may be randomly set in an upper limit range or a lower limit range. To be specific, "≥" and ">" may be equivalently replaced, and "≤" and "<" may be equivalently replaced. This is not limited in this embodiment of this application.

It can be learned that in this embodiment of this application, the terminal receives the candidate conditional handover configuration group sent by the first cell, matches the current flight parameter with the flight-related parameter corresponding to the candidate conditional handover configuration group, and determines the candidate conditional handover configuration that is in the candidate conditional handover configuration group and that corresponds to the current flight parameter as the target conditional handover configuration used to determine that the terminal expects to access the second cell. This improves accuracy of obtaining a conditional handover configuration by the terminal, and further improves efficiency and accuracy of cell handover of the terminal.

It may be understood that in the foregoing method embodiments, the methods or steps implemented by the terminal may alternatively be implemented by a component (for example, a chip or a circuit) that may be configured in the terminal, or the methods or steps implemented by the access network device may alternatively be implemented by a component (for example, a chip or a circuit) that may be configured in the access network device.

Figure 3:
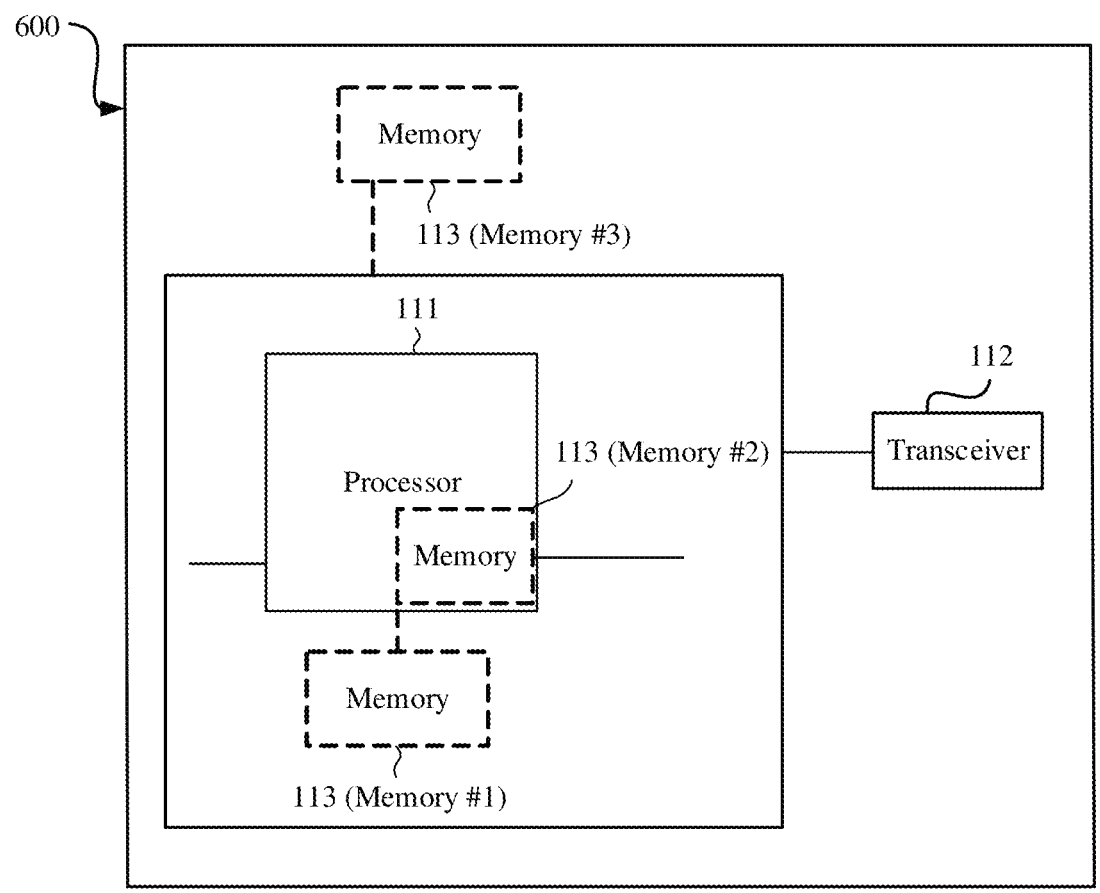
FIG. 3 is a block diagram of a structure of a communication apparatus according to an embodiment of this application.

FIG. 3 is a block diagram of a structure of a communication apparatus 600 according to an embodiment of this application. It should be understood that the communication apparatus 600 can perform steps performed by the terminal or the access network device in the methods described in FIG. 2B to FIG. 2J. To avoid repetition, details are not described herein again. The communication apparatus 600 includes a processor in and a memory 113. The processor in and the memory 113 are electrically coupled.

The memory 113 is configured to store computer program instructions. Optionally, the memory 113 (Memory #1) is disposed in the apparatus, the memory 113 (Memory #2) is integrated with the processor 111, or the memory 113 (Memory #3) is disposed outside the apparatus.

The processor 111 is configured to execute some or all computer program instructions in the memory. When the some or all computer program instructions are executed, the apparatus is enabled to perform the method in any one of the foregoing embodiments.

Optionally, the apparatus further includes a transceiver 112. The transceiver 112 is configured to communicate with another device, for example, receive a candidate conditional handover configuration group sent by a first cell.

It should be understood that the communication apparatus 600 shown in FIG. 3 may be a chip or a circuit. For example, the communication apparatus 600 may be a chip or a circuit that may be disposed in a terminal apparatus or a communication apparatus. Alternatively, the transceiver 112 may be a communication interface. The transceiver includes a receiver and a transmitter. Further, the communication apparatus 600 may further include a bus system.

The processor in, the memory 113, and the transceiver 112 are connected through the bus system. The processor 111 is configured to execute the instructions stored in the memory 113, to control the transceiver to receive a signal and send a signal and complete the steps of the communication apparatus or the terminal apparatus in the implementation method in this application. The memory 113 may be integrated into the processor 111, or may be disposed separately from the processor 111.

In an implementation, it may be considered that functions of the transceiver 112 are implemented by using a transceiver circuit or a dedicated transceiver chip. It may be considered that the processor 111 may be implemented by using a dedicated processing chip, a processing circuit, a processor, or a general-purpose chip. The processor may be a central processing unit (CPU), a network processor (NP), or a combination of the CPU and the NP. The processor may further include a hardware chip or another general-purpose processor. The foregoing hardware chip may be an application-specific integrated circuit (ASIC), a programmable logic device (PLD), or a combination thereof. The PLD may be a complex programmable logic device (CPLD), a field-programmable gate array (FPGA), general array logic (GAL) and another programmable logic device, a discrete gate or transistor logic device, a discrete hardware component, or any combination thereof. The general-purpose processor may be a microprocessor, or the processor may be any conventional processor or the like.

It may be further understood that the memory mentioned in embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external cache. By way of example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this application is intended to include, but is not limited to, these memories and any memory of another proper type.

An embodiment of this application provides a computer storage medium. The computer-readable storage medium stores a computer program, and the computer program includes instructions used to perform the method corresponding to the terminal in the foregoing embodiments.

An embodiment of this application provides a computer storage medium. The computer-readable storage medium stores a computer program, and the computer program includes instructions used to perform the method corresponding to the access network device in the foregoing embodiments.

An embodiment of this application provides a computer program product including instructions. When the computer program product runs on a computer, the computer is enabled to perform the method corresponding to the terminal in the foregoing embodiments.

An embodiment of this application provides a computer program product including instructions. When the computer program product runs on a computer, the computer is enabled to perform the method corresponding to the access network device in the foregoing embodiments.

Figure 4:
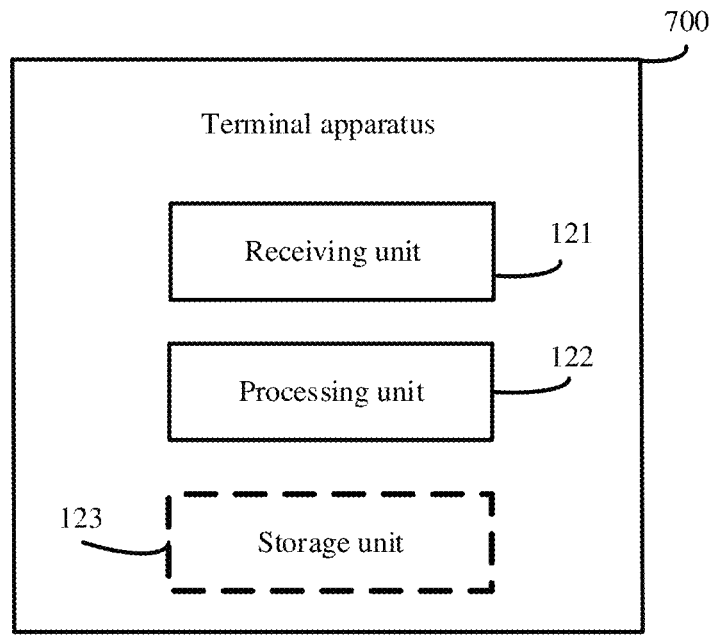
FIG. 4 is a schematic block diagram of a terminal apparatus according to an embodiment of this application.

FIG. 4 shows a communication apparatus 700 according to an embodiment of this application. The communication apparatus 700 may be configured to perform the foregoing communication method applied to a terminal and the foregoing specific embodiments. The apparatus may be a terminal or a chip that may be configured in the terminal. As shown in FIG. 4, the apparatus includes a receiving unit 121 and a processing unit 122.

The receiving unit 121 is configured to receive a candidate conditional handover configuration group, where the candidate conditional handover configuration group includes one or more candidate conditional handover configurations, and the one or more candidate conditional handover configurations correspond to a flight-related parameter of the terminal.

The processing unit 122 is configured to: obtain a current flight parameter, and determine a target conditional handover configuration from the candidate conditional handover configuration group based on the current flight parameter. The target conditional handover configuration is used to determine a second cell that the terminal expects to access.

Optionally, the current flight parameter includes a current flight height, and the flight-related parameter includes a flight height parameter. The processing unit 122 is further configured to determine, based on a correspondence between the current flight height and the flight height parameter, the target conditional handover configuration from a candidate conditional handover configuration group corresponding to the flight height parameter.

Optionally, the flight height parameter is a plurality of height ranges. The processing unit 122 is further configured to: obtain a target height range, where the target height range is a height range corresponding to the current flight height; and obtain a candidate conditional handover configuration corresponding to the target height range, and determine the candidate conditional handover configuration as the target conditional handover configuration.

Optionally, the flight-related parameter includes flight path information, the flight path information includes flight point information of each of one or more flight points, the one or more flight points are in a one-to-one correspondence with the one or more candidate conditional handover configurations, and the current flight parameter includes a current flight point parameter. The processing unit 122 is further configured to determine a target flight point from the one or more flight points based on a matching relationship between the current flight point parameter and the flight point information of each of the one or more flight points; and use a candidate conditional handover configuration corresponding to the target flight point as the target conditional handover configuration.

Optionally, the current flight point parameter includes a current system time point, and the flight point information includes an estimated time point of arrival. The processing unit 122 is further configured to: obtain a target time point, where the target time point is a time point that matches the current system time point in the estimated time point of arrival; and use a flight point corresponding to the target time point as the target flight point.

Optionally, the current flight point parameter includes a current flight location, and the flight point information includes a flight point location. The processing unit 122 is further configured to: obtain a target flight point location, where the target flight point location is a location that matches the current flight location in the flight point location; and use a flight point corresponding to the target flight point location as the target flight point.

The current flight point parameter includes a current system time point and a current flight location, and the flight point information includes an estimated time point of arrival and a flight point location. The processing unit 122 is further configured to: obtain a target time point, where the target time point is a time point that matches the current system time point in the estimated time point of arrival; obtain a flight point location corresponding to the target time point, and determine whether the flight point location matches the current flight location; and when the flight point location successfully matches the current flight location, determine a flight point corresponding to the flight point location as the target flight point.

Optionally, the flight path information further includes a flight height parameter corresponding to each flight point, and the current flight parameter includes a current flight height. The processing unit 122 is further configured to: obtain a target height of the target flight point, where the target height is a flight height parameter that matches the current flight height; and determine, based on the target height, the target conditional handover configuration from the candidate conditional handover configuration group.

Optionally, the processing unit is further configured to: after determining to access the second cell, release the candidate conditional handover configuration group.

Optionally, before releasing the candidate conditional handover configuration group, the processing unit 122 is further configured to determine that an update candidate conditional handover configuration group sent by the second cell is received.

Optionally, the processing unit 122 is further configured to release the candidate conditional handover configuration group after a first preset time is reached.

Optionally, the foregoing processing unit 122 may be a chip, an encoder, an encoding circuit, or another integrated circuit that can implement the method in this application.

The receiving unit 121 may be an interface circuit or a transceiver.

A specific method and embodiment have been described above, and the apparatus 700 is configured to perform a communication method corresponding to a terminal. Therefore, for specific descriptions of the communication method, especially for functions of the receiving unit 121 and the processing unit 122, refer to a related part in a corresponding embodiment.

Details are not described herein again.

Optionally, the apparatus 700 may further include a storage unit 123. The storage unit 123 may be configured to store data and/or signaling. The storage unit 123 may be coupled to the processing unit 122, or may be coupled to the receiving unit 121. For example, the processing unit 122 may be configured to read data and/or signaling in the storage unit 123, so that the communication method in the foregoing method embodiment is performed.

Figure 5:
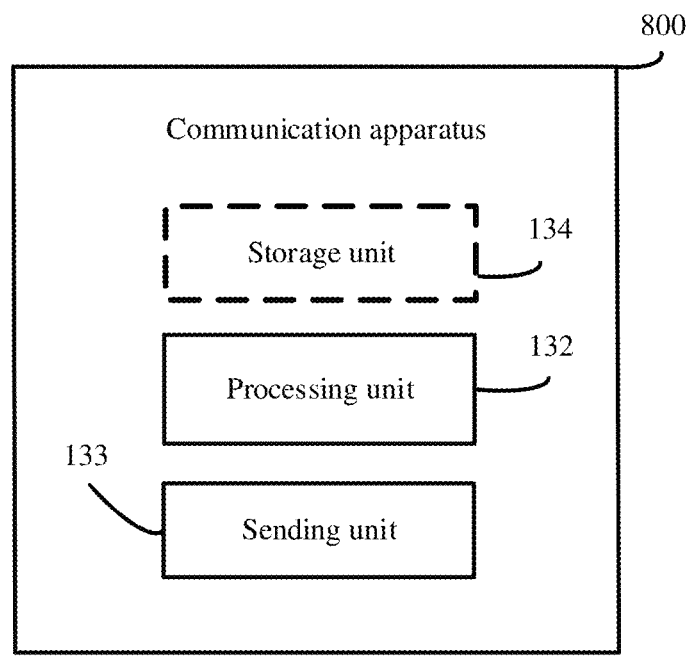
FIG. 5 is a schematic block diagram of a communication apparatus according to an embodiment of this application.

FIG. 5 shows a communication apparatus 800 according to an embodiment of this application. The communication apparatus 800 may be configured to perform the foregoing communication and specific embodiments applicable to the foregoing access network device. The apparatus may be an access network device or a communication chip disposed in the access network device. As shown in FIG. 5, the apparatus includes a processing unit 132 and a sending unit (Output(s)) 133.

The processing unit 132 is configured to generate a candidate conditional handover configuration group, where the candidate conditional handover configuration group includes one or more candidate conditional handover configurations, and the one or more candidate conditional handover configurations correspond to a flight-related parameter of a terminal.

The sending unit 133 is configured to send a conditional handover configuration group to the terminal, so that the terminal determines a target conditional handover configuration from the candidate conditional handover configuration group based on a current flight parameter. The target conditional handover configuration is used to determine a second cell that the terminal expects to access.

Optionally, the flight-related parameter includes a flight height parameter, and the generating a candidate conditional handover configuration group includes: generating a candidate conditional handover configuration group corresponding to the flight height parameter.

Optionally, the flight height parameter is a plurality of height ranges. The processing unit 132 is specifically configured to: generate a candidate conditional handover configuration group corresponding to the plurality of height ranges.

Optionally, the flight-related parameter includes flight path information. The processing unit 132 is specifically configured to: generate a candidate conditional handover configuration group corresponding to flight point information, where flight point information of each of one or more flight points is in a one-to-one correspondence with the one or more candidate conditional handover configurations in the candidate conditional handover configuration group.

Optionally, the flight point information includes an estimated time point of arrival of each flight point. The processing unit 132 is specifically configured to: generate, based on the estimated time point of arrival of each flight point, a candidate conditional handover configuration corresponding to each flight point, to form a candidate conditional handover configuration group corresponding to the flight point.

Optionally, the flight point information includes a flight point location of each flight point. The processing unit 132 is specifically configured to: generate, based on the flight point location of each flight point, a candidate conditional handover configuration corresponding to each flight point, to form a candidate conditional handover configuration group corresponding to the flight point.

Optionally, the flight point information includes a flight point location and an estimated time point of arrival of each flight point. The processing unit 132 is specifically configured to: generate, based on the flight point location and the estimated time point of arrival of each flight point, a candidate conditional handover configuration corresponding to each flight point, to form a candidate conditional handover configuration group corresponding to the flight point.

Optionally, the flight path information further includes a flight height parameter. The processing unit 132 is specifically configured to: generate, based on the flight point information of each flight point and the flight height parameter, a candidate conditional handover configuration group corresponding to each flight point, to form a candidate conditional handover configuration group corresponding to the flight point.

Optionally, the sending unit 133 is specifically configured to: send the candidate conditional handover configuration group to the terminal by using radio resource control RRC dedicated signaling.

Optionally, the sending unit 133 is further configured to: send the candidate conditional handover configuration group to the second cell, so that the second cell continues to use the candidate conditional handover configuration group when no update candidate conditional handover configuration group is generated; and release the candidate conditional handover configuration group when the update candidate conditional handover configuration group is generated.

Optionally, the foregoing processing unit 132 may be a chip, an encoder, an encoding circuit, or another integrated circuit that can implement the method in this application.

The sending unit 133 may be an interface circuit or a transceiver.

A specific method and embodiment have been described above, and the apparatus 800 is configured to perform a communication method corresponding to an access network device. Therefore, for specific descriptions of the communication method, especially for a function of the processing unit 132 or the sending unit 133, refer to a related part in a corresponding embodiment. Details are not described herein again.

Optionally, the apparatus 800 may further include a storage unit 134. The storage unit 134 may be configured to store data and/or signaling. The storage unit 134 may be coupled to the processing unit 132, or may be coupled to the sending unit 133. For example, the processing unit 132 may be configured to read data and/or signaling in the storage unit 134, so that the communication method in the foregoing method embodiment is performed.

Figure 6:
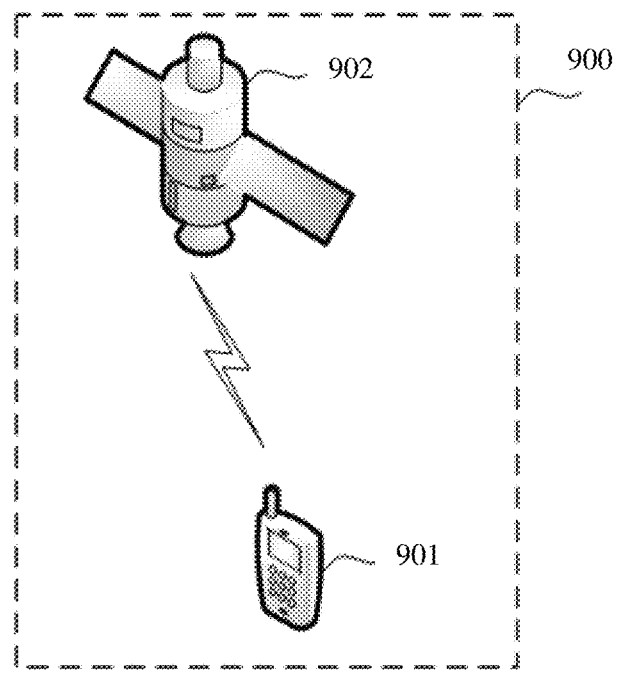
FIG. 6 is a schematic diagram of a communication system according to an embodiment of this application.

FIG. 6 shows a communication system 900 according to an embodiment of this application. The communication system 900 includes a terminal 901 and an access network device 902. The terminal 901 and the access network device 902 may include a structure corresponding to the communication apparatus 600 shown in FIG. 6. Alternatively, the terminal 901 may include a communication apparatus 700, and the access network device 902 may include a communication apparatus 800. The communication system 900 may be configured to perform the foregoing communication method and specific embodiments that are applicable to the foregoing terminal and access network device. For a specific execution process, refer to description content in FIG. 2A to FIG. 2J.

A person of ordinary skill in the art may be aware that, units and algorithm steps in examples described with reference to the embodiments disclosed in this specification can be implemented by electronic hardware or a combination of computer software and electronic hardware. Whether functions are performed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that, for a purpose of convenient and brief descriptions, for a detailed working process of the foregoing system, apparatus, and unit, refer to a corresponding process in the foregoing method embodiment. Details are not described herein.

In the several embodiments provided in this application, it should be understood that the described apparatus embodiments are merely examples. For example, division into units is merely logical function division. During actual implementation, there may be other division manner. For example, a plurality of units or components may be combined or integrated into another system, or some features may be ignored or not performed. In addition, the displayed or discussed mutual communication connections may be implemented through some interfaces, and the indirect couplings or communication connections between apparatuses or units may be implemented in an electronic form, a mechanical form, or another form.

In addition, units in apparatus embodiments of this application may be integrated into one processing unit, each of the units may exist alone physically, or two or more units may be integrated into one unit.

It may be understood that, the processor in embodiments of this application may be a central processing unit (CPU), the processor may further be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor.

All or some of the methods in embodiments of this application may be implemented by software, hardware, firmware, or any combination thereof. When the software is used to implement the embodiments, all or some of the embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, or another programmable apparatus. The computer program or the instructions may be stored in a computer-readable storage medium, or may be transmitted by using the computer-readable storage medium. The computer-readable storage medium may be any usable medium accessible by a computer, or a data storage device such as a server integrating one or more usable media. The usable medium may be a magnetic medium such as a floppy disk, a hard disk, or a magnetic tape, may be an optical medium such as a CD-ROM or a DVD, or may be a semiconductor medium such as a solid-state drive (SSD), a random access memory (RAM), a read-only memory (ROM), or a register.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or the processor of the any other programmable data processing device generate an apparatus for implementing a specific function in one or more processes in the flowcharts and/or in one or more blocks in the block diagrams.

What is claimed is:

1. A method, applied to a terminal, wherein the method comprises:
   receiving a candidate conditional handover configuration group of one or more candidate conditional handover configuration groups for handing over the terminal from one access network device to another access network device, wherein the candidate conditional handover configuration group comprises one or more candidate conditional handover configurations, and the one or more candidate conditional handover configurations correspond to at least one flight-related parameter of the terminal, wherein the at least one flight-related parameter comprises flight path information, and the flight path information comprises flight point information of each of one or more flight points; and
   obtaining a current flight parameter of the terminal, wherein the current flight parameter comprises a current flight point parameter;
   determining a target conditional handover configuration for the terminal from the candidate conditional handover configuration group based on the current flight parameter by at least:
     determining a target flight point from the one or more flight points based on a matching relationship between the current flight point parameter and the flight point information; and
     obtaining, from the candidate conditional handover configuration group corresponding to the target flight point, a candidate conditional handover configuration corresponding to the target flight point as the target conditional handover configuration; and
   determining a second cell to be accessed based on the target conditional handover configuration for the terminal.

2. The method according to claim 1, wherein the current flight parameter further comprises a current flight height, the at least one flight-related parameter further comprises a flight height parameter, and determining the target conditional handover configuration from the candidate conditional handover configuration group based on the current flight parameter further comprises:
   determining, further based on a correspondence between the current flight height and the flight height parameter, the target conditional handover configuration from the candidate conditional handover configuration group corresponding to the flight height parameter.

3. The method according to claim 2, wherein the flight height parameter is a plurality of height ranges, and determining, further based on the correspondence between the current flight height and the flight height parameter, the target conditional handover configuration from the candidate conditional handover configuration group corresponding to the flight height parameter comprises:
- obtaining a target height range, wherein the target height range is a height range corresponding to the current flight height; and
- obtaining, from the candidate conditional handover configuration group corresponding to the flight height parameter, a candidate conditional handover configuration corresponding to the target height range, and determining the candidate conditional handover configuration as the target conditional handover configuration.

4. The method according to claim 1, wherein the one or more flight points are in a one-to-one correspondence with the one or more candidate conditional handover configurations.

5. The method according to claim 4, wherein the current flight point parameter comprises a current system time point, the flight point information comprises an estimated time point of arrival, and determining the target flight point from the one or more flight points based on the matching relationship between the current flight point parameter and the flight point information of each of the one or more flight points comprises:
- obtaining a target time point, wherein the target time point is a time point that matches the current system time point in the estimated time point of arrival; and
- using a flight point corresponding to the target time point as the target flight point.

6. The method according to claim 4, wherein the current flight point parameter comprises a current flight location, the flight point information comprises a flight point location, and determining the target flight point from the one or more flight points based on the matching relationship between the current flight point parameter and the flight point information of each of the one or more flight points comprises:
- obtaining a target flight point location, wherein the target flight point location is a location that matches the current flight location in the flight point location; and
- using a flight point corresponding to the target flight point location as the target flight point.

7. The method according to claim 4, wherein the current flight point parameter comprises a current system time point and a current flight location, the flight point information comprises an estimated time point of arrival and a flight point location, and determining the target flight point from the one or more flight points based on the matching relationship between the current flight point parameter and the flight point information of each of the one or more flight points comprises:
- obtaining a target time point, wherein the target time point is a time point that matches the current system time point in the estimated time point of arrival;
- obtaining the flight point location corresponding to the target time point, and determining whether the flight point location matches the current flight location; and
- when the flight point location successfully matches the current flight location, determining a flight point corresponding to the flight point location as the target flight point.

8. The method according to claim 4, wherein the flight path information further comprises a flight height parameter corresponding to each flight point, the current flight parameter further comprises a current flight height, the candidate conditional handover configuration corresponding to the target flight point is a candidate conditional handover configuration group corresponding to a combination of the flight point information of the target flight point and the flight height parameter, and obtaining the candidate conditional handover configuration corresponding to the target flight point comprises:
- obtaining a target height of the target flight point, wherein the target height is the flight height parameter that matches the current flight height; and
- determining, based on the target height, the target conditional handover configuration from the candidate conditional handover configuration group corresponding to the target flight point.

9. The method according to claim 1, wherein the method further comprises at least one of the following:
- after handover is completed based on the target conditional handover configuration, releasing the candidate conditional handover configuration group;
- after an update candidate conditional handover configuration group is received, releasing the candidate conditional handover configuration group; or
- after a first preset time point is reached, releasing the candidate conditional handover configuration group.

10. A method, applied to an access network device, wherein the method comprises:
- generating a candidate conditional handover configuration group of one or more candidate conditional handover configuration groups for handing over a terminal from the access network device to another access network device, wherein the candidate conditional handover configuration group comprises one or more candidate conditional handover configurations, and the one or more candidate conditional handover configurations correspond to at least one flight-related parameter of the terminal,
- wherein the at least one flight-related parameter comprises flight path information, the flight path information comprises flight point information of each of one or more flight points, and the at least one flight-related parameter further comprises a target flight point, and the target flight point of the candidate conditional handover configuration group corresponds to a candidate conditional handover configuration in the one or more candidate conditional handover configurations that is indicated by a matching relationship between a current flight point parameter associated with the terminal and the flight point information; and
- sending the candidate conditional handover configuration group to the terminal, wherein the candidate conditional handover configuration group causes the terminal to determine a second cell to be accessed by the terminal based on the candidate conditional handover configuration group.

11. The method according to claim 10, wherein the at least one flight-related parameter further comprises a flight height parameter.

12. The method according to claim 11, wherein the flight point information comprises an estimated time point of arrival of each flight point, and generating the candidate conditional handover configuration group comprises:
- generating, based on the estimated time point of arrival of each flight point, a candidate conditional handover configuration corresponding to each flight point, to form a candidate conditional handover configuration group corresponding to the one or more flight points; or wherein the flight point information comprises a flight point location of each flight point, and generating the candidate conditional handover configuration group corresponding to the flight point information comprises:

generating, based on the flight point location of each flight point, a candidate conditional handover configuration corresponding to each flight point, to form a candidate conditional handover configuration group corresponding to the target flight point; or wherein the flight point information comprises the flight point location and the estimated time point of arrival of each flight point, and generating the candidate conditional handover configuration group corresponding to the flight point information comprises:

generating, based on the flight point location and the estimated time point of arrival of each flight point, a candidate conditional handover configuration corresponding to each flight point, to form the candidate conditional handover configuration group corresponding to the target flight point.

13. The method according to claim 11, wherein the flight path information further comprises the flight height parameter, and generating the candidate conditional handover configuration group comprises:

generating, based on the flight point information of each flight point and the flight height parameter, a candidate conditional handover configuration group corresponding to each flight point, to form the candidate conditional handover configuration group corresponding to each flight point.

14. The method according to claim 10, wherein sending the candidate conditional handover configuration group to the terminal comprises:

sending the candidate conditional handover configuration group to the terminal by using radio resource control (RRC) dedicated signaling.

15. The method according to claim 10, wherein the method further comprises:

sending the candidate conditional handover configuration group to the another access network device.

16. An apparatus, wherein the apparatus comprises:

a first circuitry, configured to:
receive a candidate conditional handover configuration group of one or more candidate conditional handover configuration groups for handing over a terminal from the apparatus to another access network device, wherein the candidate conditional handover configuration group comprises one or more candidate conditional handover configurations, and the one or more candidate conditional handover configurations correspond to a flight-related parameter of the terminal, wherein the flight-related parameter comprises flight path information, and the flight path information comprises flight point information of each of one or more flight points; and a second circuitry, configured to:
obtain a current flight parameter for the terminal, wherein the current flight parameter comprises a current flight point parameter, determine a target conditional handover configuration from the candidate conditional handover configuration group based on the current flight parameter, wherein to determine the candidate conditional handover configuration for the candidate conditional handover configuration group, the second circuitry is configured to:

determine a target flight point from the one or more flight points based on a matching relationship between the current flight point parameter and the flight point information; and obtain, from the candidate conditional handover configuration group corresponding to the target flight point, a candidate conditional handover configuration corresponding to the target flight point as the target conditional handover configuration; and determine a second cell to be accessed based on the target conditional handover configuration for the terminal.

17. The apparatus according to claim 16, wherein the current flight parameter further comprises a current flight height, the flight-related parameter further comprises a flight height parameter the second circuitry is further configured to determine further based on a correspondence between the current flight height and the flight height parameter, the target conditional handover configuration from the candidate conditional handover configuration group corresponding to the flight height parameter.

18. The apparatus according to claim 16, wherein the one or more flight points are in a one-to-one correspondence with the one or more candidate conditional handover configurations.

19. The apparatus according to claim 18, wherein the current flight point parameter comprises a current system time point, and the flight point information comprises an estimated time point of arrival; or the current flight point parameter comprises a current flight location, and the flight point information comprises a flight point location; or the current flight point parameter comprises the current system time point and the current flight location, and the flight point information comprises the estimated time point of arrival and the flight point location.

20. The apparatus according to claim 16, further configured to:

after handover is completed based on the target conditional handover configuration, release the candidate conditional handover configuration group; or after an update candidate conditional handover configuration group is received, release the candidate conditional handover configuration group; or after a first preset time point is reached, release the candidate conditional handover configuration group.

\* \* \* \* \*